(12) United States Patent
Kim et al.

(10) Patent No.: US 11,888,567 B2
(45) Date of Patent: Jan. 30, 2024

(54) METHOD FOR TRANSMITTING AND RECEIVING CHANNEL STATE INFORMATION IN WIRELESS COMMUNICATION SYSTEM, AND APPARATUS THEREFOR

(71) Applicant: LG ELECTRONICS INC., Seoul (KR)

(72) Inventors: Kyuseok Kim, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/137,846

(22) Filed: Apr. 21, 2023

(65) Prior Publication Data

US 2023/0261714 A1    Aug. 17, 2023

Related U.S. Application Data

(63) Continuation of application No. PCT/KR2021/015043, filed on Oct. 25, 2021.

(30) Foreign Application Priority Data

Oct. 23, 2020  (KR) .......... 10-2020-0138682
May 11, 2021  (KR) .......... 10-2021-0060563

(51) Int. Cl.
*H04B 7/06* (2006.01)

(52) U.S. Cl.
CPC .......... *H04B 7/0626* (2013.01); *H04B 7/063* (2013.01); *H04B 7/0639* (2013.01)

(58) Field of Classification Search
CPC .... H04B 7/0626; H04B 7/063; H04B 7/0639; H04B 7/0456; H04B 7/06; H04B 7/0608;

(Continued)

(56) References Cited

U.S. PATENT DOCUMENTS

2017/0202014 A1*  7/2017  Moon .................. H04B 7/0626

FOREIGN PATENT DOCUMENTS

| KR | 10-2016-0094321 A | 8/2016 |
| KR | 10-2017-0038759 A | 4/2017 |
| KR | 10-2018-0057673 A | 5/2018 |

OTHER PUBLICATIONS

3rd Generation Partnership Project; Technical Specification Group Radio Access Network; NR; Physical layer procedures for data (Release 16), 3GPP TS 38.214 V16.3.0 (Sep. 2020).

* cited by examiner

*Primary Examiner* — Ayanah S George
(74) *Attorney, Agent, or Firm* — BRYAN CAVE LEIGHTON PAISNER LLP

(57) ABSTRACT

A method by which a terminal reports channel state information (CSI) in a wireless communication system, according to an embodiment of the present specification, comprises the steps of: receiving configuration information related to reporting of CSI; receiving a channel state information-reference signal (CSI-RS); calculating the CSI on the basis of the CSI-RS; and reporting the CSI. The CSI comprises first information for selecting an antenna port related to the CSI-RS. The pre-set number of antenna ports are selected for each antenna port-related polarization from among antenna ports related to the CSI-RS, on the basis of the first information. The pre-set number of antenna ports are characterized in being selected on the basis of a combination of the number of the antenna ports related to the CSI-RS and the pre-set number.

11 Claims, 15 Drawing Sheets

(58) Field of Classification Search
CPC ... H04B 7/0634; H04L 5/0023; H04L 5/0048; H04L 1/00; H04L 25/02
See application file for complete search history.

FIG. 8

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | } 8a |
|---|---|---|---|---|---|---|---|---|---|---|---|---|---|---|---|---|---|---|---|---|---|---|---|---|---|---|---|---|---|---|---|---|---|
| 32 | 10 | 14 | 18 | 21 | 23 | 25 | 27 | 29 | 30 | 31 | 32 | 33 | 34 | 34 | 35 | 35 | 35 | 34 | 34 | 33 | 32 | 31 | 30 | 29 | 27 | 25 | 23 | 21 | 18 | 14 | 10 | 5 | } 8b |

FIG. 9

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | } 9a |
|---|---|---|---|---|---|---|---|---|---|---|---|---|---|---|---|---|---|---|---|---|---|---|---|---|---|---|---|---|---|---|---|---|---|
| 32 | 5 | 9 | 13 | 16 | 18 | 20 | 22 | 24 | 25 | 26 | 27 | 28 | 29 | 29 | 30 | 30 | 30 | 29 | 29 | 28 | 27 | 26 | 25 | 24 | 22 | 20 | 18 | 16 | 13 | 9 | 5 | 0 | } 9b |

FIG. 10

| | 8 | 12 | 20 | 24 | } 10a |
|---|---|---|---|---|---|
| 32 | 26 | 30 | 30 | 26 | } 10b |

FIG. 11

| | 1 | 2 | 3 | 4 | 5 | 6 | 7 | 8 | 9 | 10 | 11 | 12 | 13 | 14 | 15 | 16 | } 11a |
|---|---|---|---|---|---|---|---|---|---|---|---|---|---|---|---|---|---|
| 32 | 7 | 10 | 13 | 15 | 17 | 19 | 21 | 23 | 26 | 28 | 30 | 32 | 34 | 36 | 38 | 40 | } 11b |

FIG. 12

| | 1 | 2 | 3 | 4 | 5 | 6 | 7 | 8 | 9 | 10 | 11 | 12 | 13 | 14 | 15 | 16 | } 12a |
|---|---|---|---|---|---|---|---|---|---|---|---|---|---|---|---|---|---|
| 32 | 2 | 5 | 8 | 10 | 12 | 14 | 16 | 18 | 21 | 23 | 25 | 27 | 29 | 31 | 33 | 35 | } 12b |

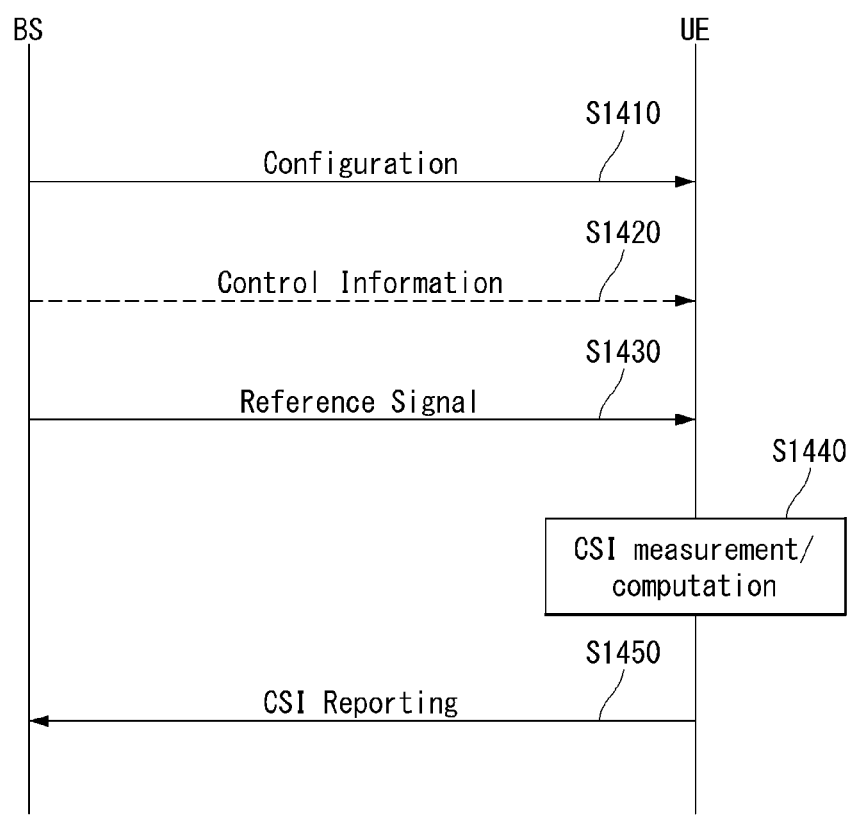

METHOD FOR TRANSMITTING AND RECEIVING CHANNEL STATE INFORMATION IN WIRELESS COMMUNICATION SYSTEM, AND APPARATUS THEREFOR

This application is a Bypass Continuation of International Application No. PCT/KR2021/015043, filed on Oct. 25, 2021, which claims the benefit of KR Application No. 10-2020-0138682, filed on Oct. 23, 2020, and No. 10-2021-0060563, filed on May 11, 2021, the contents of which are all hereby incorporated by reference herein in their entirety.

TECHNICAL FIELD

The present disclosure relates to a method of transmitting and receiving channel state information in a wireless communication system, and an apparatus therefor.

BACKGROUND

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

SUMMARY

In a CSI feedback operation, L continuous CSI-RS ports are selected for each polarization through $i_{1,1}$, which is one of the codebook indexes for PMI reporting. This existing operation has a low degree of freedom of a UE for CSI-RS port selection, so a method of improving this is required.

The present disclosure proposes a method of solving the above-described problem.

The technical objects of the present disclosure are not limited to the aforementioned technical objects, and other technical objects, which are not mentioned above, will be apparently appreciated by a person having ordinary skill in the art from the following description.

According to an embodiment of the present disclosure, a method of reporting channel state information by a user equipment (UE) in a wireless communication system includes: receiving configuration information related to reporting of channel state information (CSI); receiving a channel state information-reference signal (CSI-RS); calculating the CSI based on the CSI-RS; and reporting the CSI.

The CSI includes first information for selecting an antenna port related to the CSI-RS.

Preconfigured number of antenna ports are selected for each polarization related to antenna port among antenna ports related to the CSI-RS, based on the first information.

The preconfigured number of antenna ports are selected based on a combination of the number of the antenna ports related to the CSI-RS and the preconfigured number.

The number of antenna ports related to the CSI-RS may be half of a total number of antenna ports related to the CSI-RS.

A number of bits for reporting the first information may be determined based on a number of antenna port combinations that may be selected based on the preconfigured number among the antenna ports related to the CSI-RS.

The preconfigured number of antenna ports may include antenna ports based on non-contiguous port indices.

The preconfigured number of antenna ports may be common to all layers related to the CSI-RS.

The CSI may include second information for selecting one or more frequency domain (FD) basis vectors.

Based on the second information, one or more frequency domain basis vectors may be selected among frequency domain basis vectors based on a frequency band configured for reporting the CSI.

The CSI may include third information representing a non-zero coefficient. The non-zero coefficient may represent a value reported in relation to one or more specific vectors. The one or more specific vectors may be related to i) spatial domain (SD) vectors related to the preconfigured number of antenna ports and ii) the one or more frequency domain basis vectors.

Based on the first information and the second information being not reported, the third information may include information representing one or more specific antenna ports related to the non-zero coefficient among all antenna ports related to the CSI-RS.

Based on at least one of i) a total number of antenna ports related to the CSI-RS, ii) the preconfigured number, or iii) a number of the one or more frequency domain basis vectors being preconfigured to a specific value, the first information and the second information may not be reported.

Based on a parameter related to the number of precoding matrix indicators (PMIs) based on a frequency band for reporting the CSI being configured to a value of 1 or less, the CSI may be calculated based on one or more specific subbands among subbands related to the frequency band for reporting the CSI.

According to another embodiment of the present disclosure, a UE of reporting channel state information in a wireless communication system includes: one or more transceivers; one or more processors; and one or more memories operatively connectable to the one or more processors.

When the one or more memories are executed by the one or more processors, the one or more memories store instructions which cause the one or more processors to perform operations.

The operations include receiving configuration information related to reporting of channel state information (CSI); receiving a channel state information-reference signal (CSI-RS); calculating the CSI based on the CSI-RS; and reporting the CSI.

The CSI includes first information for selecting an antenna port related to the CSI-RS.

Preconfigured number of antenna ports are selected for each polarization related to antenna port among antenna ports related to the CSI-RS, based on the first information.

The preconfigured number of antenna ports are selected based on a combination of the number of the antenna ports related to the CSI-RS and the preconfigured number.

According to yet another embodiment of the present disclosure, an apparatus includes: one or more memories; and one or more processors functionally connected to one or more memories.

When the one or more memories are executed by the one or more processors, the one or more memories store instructions which cause the one or more processors to perform operations.

The operations include receiving configuration information related to reporting of channel state information (CSI); receiving a channel state information-reference signal (CSI-RS); calculating the CSI based on the CSI-RS; and reporting the CSI.

The CSI includes first information for selecting an antenna port related to the CSI-RS.

Preconfigured number of antenna ports are selected for each polarization related to antenna port among antenna ports related to the CSI-RS, based on the first information.

The preconfigured number of antenna ports are selected based on a combination of the number of the antenna ports related to the CSI-RS and the preconfigured number.

According to still yet another aspect, one or more non-transitory computer-readable media store one or more instructions.

When the one or more instructions are executed by one or more processors, the one or more instructions are configured to cause the one or more processors to perform operations.

The operations include receiving configuration information related to reporting of channel state information (CSI); receiving a channel state information-reference signal (CSI-RS); calculating the CSI based on the CSI-RS; and reporting the CSI.

The CSI includes first information for selecting an antenna port related to the CSI-RS.

Preconfigured number of antenna ports are selected for each polarization related to antenna port among antenna ports related to the CSI-RS, based on the first information.

The preconfigured number of antenna ports are selected based on a combination of the number of the antenna ports related to the CSI-RS and the preconfigured number.

According to still yet another embodiment of the present disclosure, a method of receiving channel state information by a base station (BS) in a wireless communication system includes: transmitting configuration information related to reporting of channel state information (CSI); transmitting a channel state information-reference signal (CSI-RS); and receiving the CSI.

The CSI includes first information for selecting an antenna port related to the CSI-RS.

Preconfigured number of antenna ports are selected for each polarization related to antenna port among antenna ports related to the CSI-RS, based on the first information.

The preconfigured number of antenna ports are selected based on a combination of the number of the antenna ports related to the CSI-RS and the preconfigured number.

According to still yet another embodiment of the present disclosure, a base station (BS) of receiving channel state information in a wireless communication system includes: one or more transceivers; one or more processors; and one or more memories operatively connectable to the one or more processors.

When the one or more memories are executed by the one or more processors, the one or more memories store instructions which cause the one or more processors to perform operations.

The operations include: transmitting configuration information related to reporting of channel state information (CSI); transmitting a channel state information-reference signal (CSI-RS); and receiving the CSI.

The CSI includes first information for selecting an antenna port related to the CSI-RS.

Preconfigured number of antenna ports are selected for each polarization related to antenna port among antenna ports related to the CSI-RS, based on the first information.

The preconfigured number of antenna ports are selected based on a combination of the number of the antenna ports related to the CSI-RS and the preconfigured number.

According to the embodiments of the present disclosure, the degree of freedom of a UE related to CSI-RS port selection can be improved. In addition, a more suitable beam can be used in subsequent signaling for the corresponding UE.

Effects which may be obtained by the present disclosure are not limited to the aforementioned effects, and other technical effects not described above may be evidently understood by a person having ordinary skill in the art to which the present disclosure pertains from the following description.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 8 illustrates the number of bits related to CSI reporting according to an embodiment of the present disclosure.

FIGS. 9 and 10 illustrate the number of bits related to CSI reporting according to another embodiment of the present disclosure.

FIG. 11 illustrates the number of bits related to CSI reporting according to yet another embodiment of the present disclosure.

FIGS. 12 and 13 illustrate the number of bits related to CSI reporting according to yet another embodiment of the present disclosure.

FIG. 14 is a flowchart for describing a signaling procedure to which a method proposed by the present disclosure may be applied.

DETAILED DESCRIPTION

Figure 1:
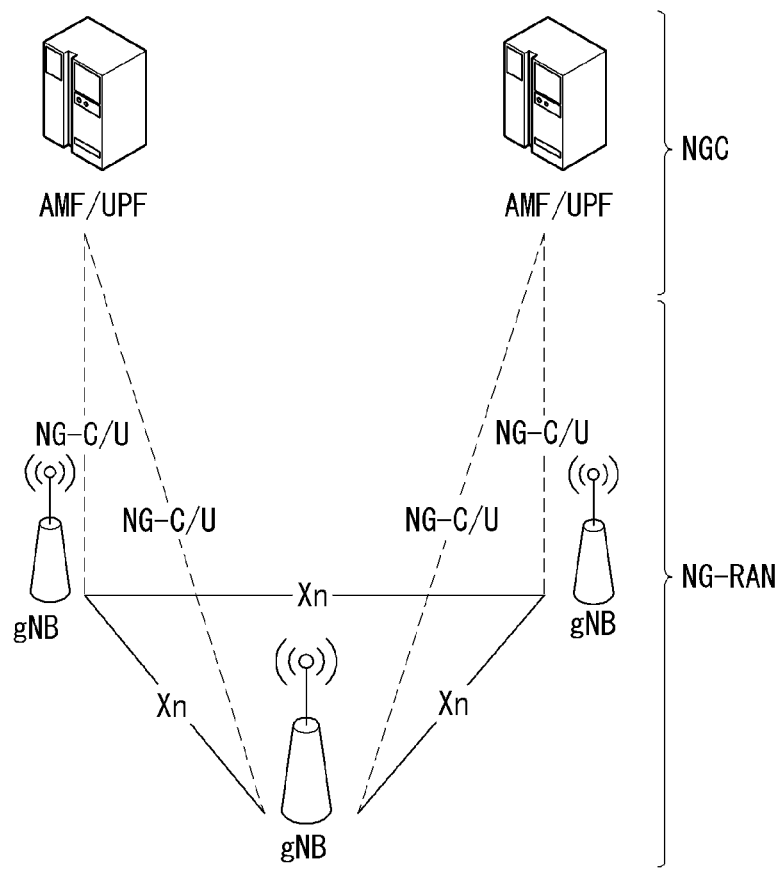
FIG. 1 is a diagram illustrating an example of an overall system structure of NR to which a method proposed in the present disclosure is applicable.

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: Anode which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15$ [kHz] | Cyclic prefix |
|---|---|---|
| 0: | 15: | Normal |
| 1: | 30: | Normal |
| 2: | 60: | Normal, Extended |
| 3: | 120: | Normal |
| 4: | 240: | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range Designation | Corresponding Frequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ m. In this case, one set of frames for uplink and one set of frames for downlink may exist.

Figure 2:
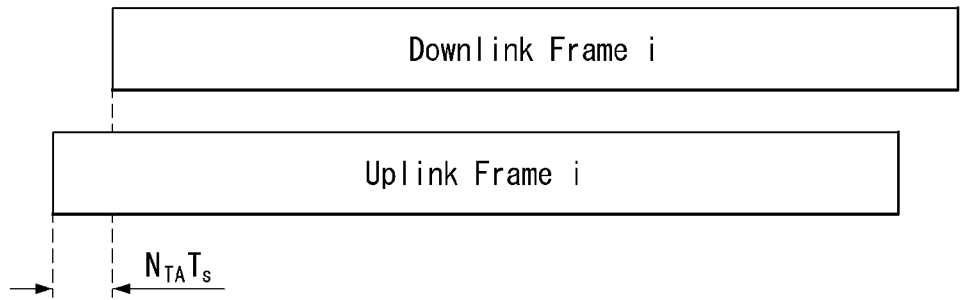
FIG. 2 illustrates a relationship between an uplink frame and a downlink frame in a wireless communication system to which a method proposed by the present disclosure is applicable.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^\mu \in \{0, \ldots, N_{subframe}^{slots, \mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame, \mu}$ of slots per radio frame, and the number $N_{slot}^{subframe, \mu}$ of slots per subframe in a normal CP. Table 4 represents the number of OFDM symbols per slot, the number of slots per radio frame, and the number of slots per subframe in an extended CP.

TABLE 3

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

Figure 3:
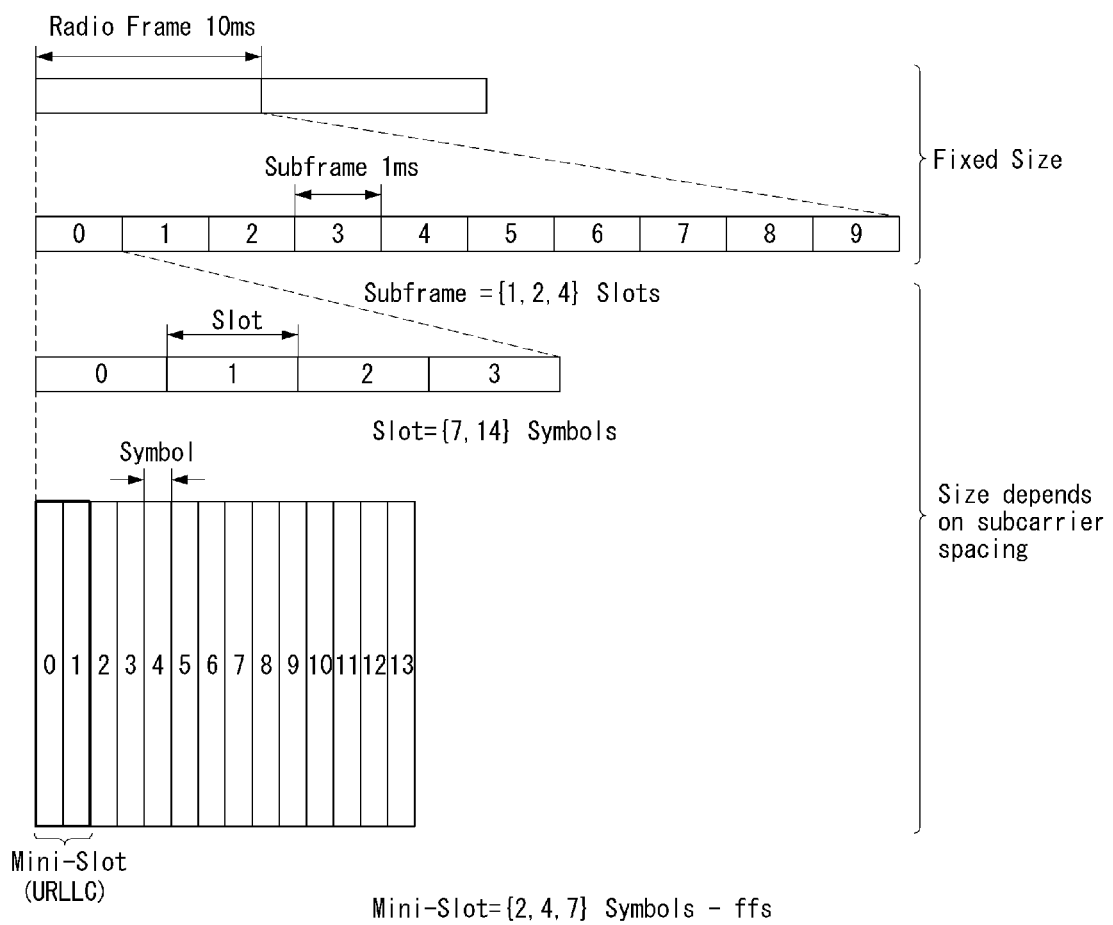
FIG. 3 illustrates an example of a frame structure in an NR system.

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

Figure 4:
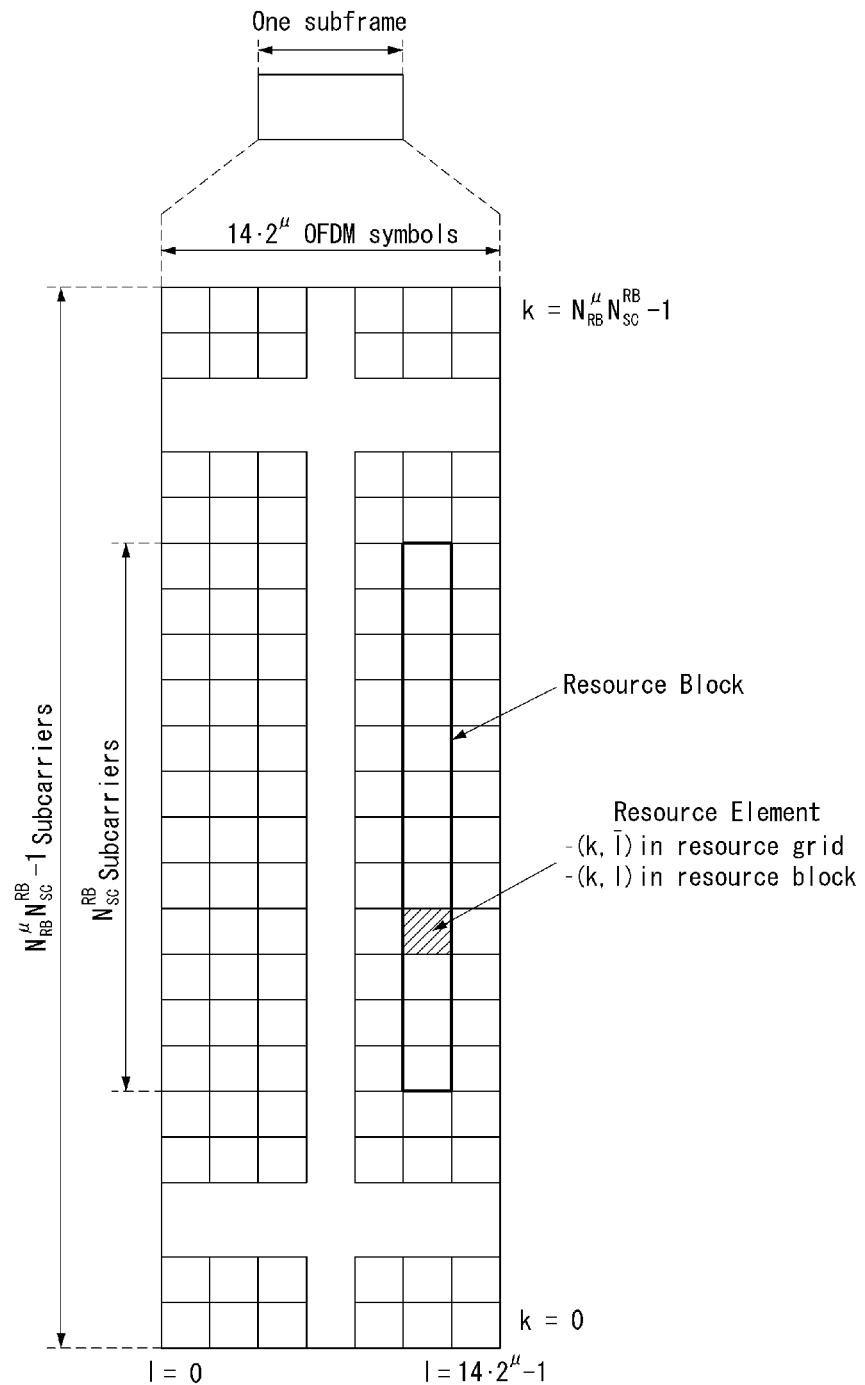
FIG. 4 illustrates an example of a resource grid supported by a wireless communication system to which a method proposed in the present disclosure is applicable.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max, \mu}$. $N_{RB}^{max, \mu}$ denotes a maximum transmission bandwidth and may change not only between numerologies but also between uplink and downlink.

Figure 5:
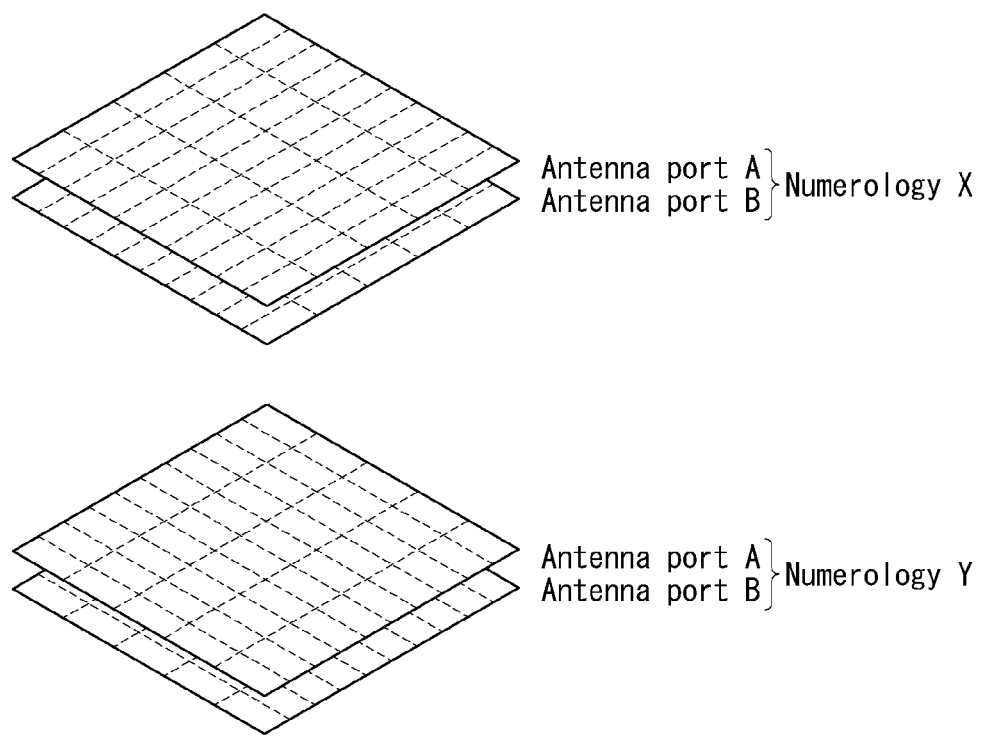
FIG. 5 illustrates examples of a resource grid for each antenna port and numerology to which a method proposed in the present disclosure is applicable.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l), where k=0, . . . , $N_{RB}^\mu N_{sc}^{RB}-1$ is an index on a frequency domain, and l=0, . . . , $2^\mu N_{symb}^{(\mu)}-1$ refers to a location of a symbol in a subframe. The index pair (k,l) is used to refer to a resource element in a slot, where l=0, . . . , $N_{symb}^\mu - 1$.

The resource element (k,l) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad [\text{Equation 1}]$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad [\text{Equation 2}]$$

Here, $N_{BWP,i}^{start}$ may be the common resource block where the BWP starts relative to the common resource block 0.

Physical Channel and General Signal Transmission

Figure 6:
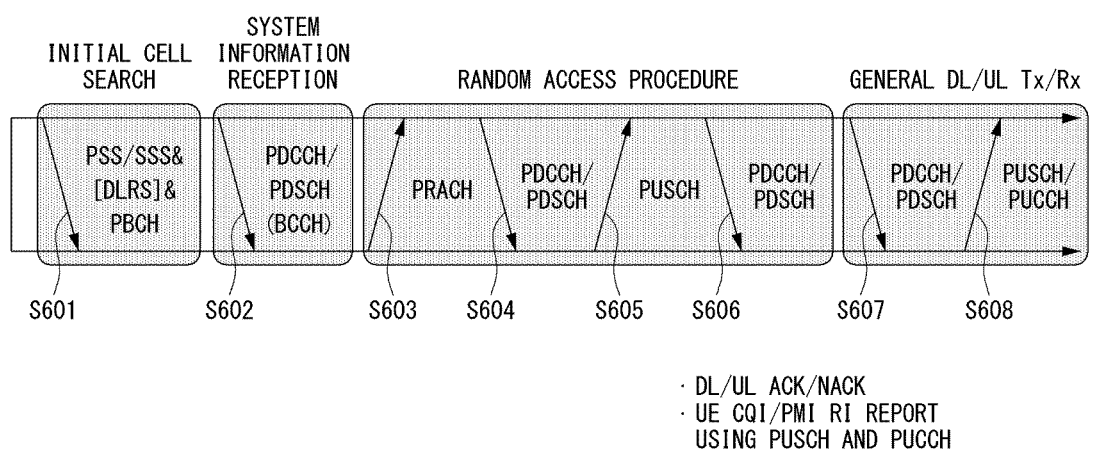
FIG. 6 illustrates physical channels and general signal transmission used in a 3GPP system.

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Hereinafter, a CSI related procedure will be described.

Figure 7:
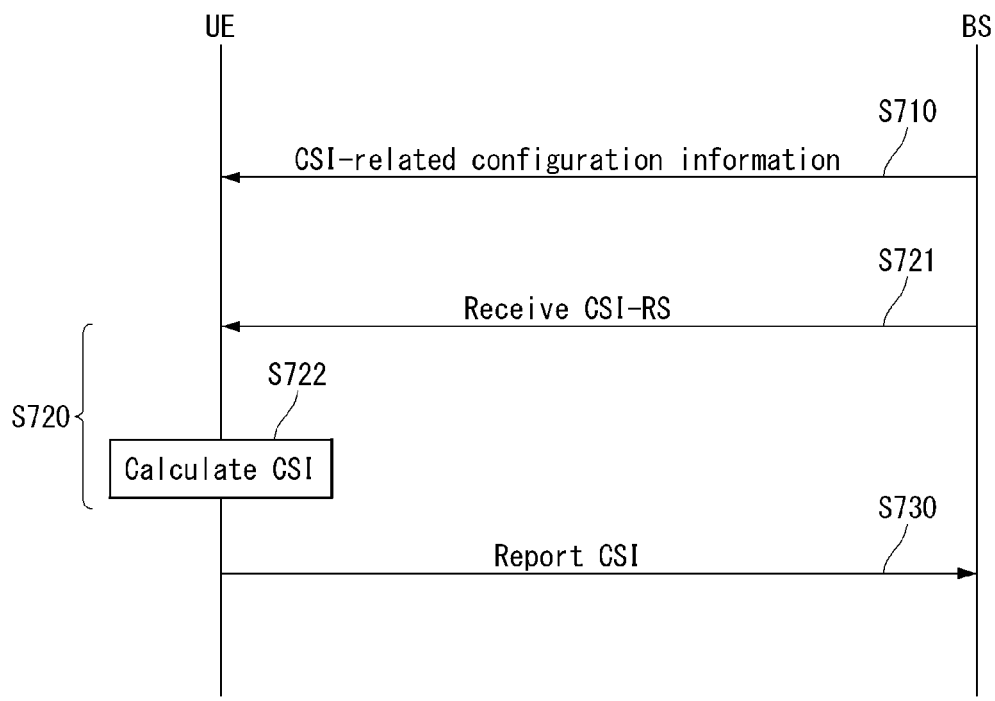
FIG. 7 is a flowchart illustrating an example of a CSI-related procedure.

FIG. 7 is a flowchart illustrating an example of a CSI related procedure.

Referring to FIG. 7, in order to perform one of usages of the CSI-RS, a terminal (e.g., user equipment (UE)) receives, from a base station (e.g., general Node B or gNB), configuration information related to the CSI through radio resource control (RRC) signaling (S710).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information may be expressed as CSI-ResourceConfig IE. The CSI resource configuration related information defines a group including at least one of a non zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 5 shows an example of NZP CSI-RS resource set IE. Referring to Table 5, parameters (e.g., a BM related 'repetition' parameter and a tracking related 'trs-Info' parameter) representing the usage may be configured for each NZP CSI-RS resource set.

TABLE 5

```
-- ASN1START
-- TAG-NZP-CSI-RS-RESOURCESET-START
NZP-CSI-RS-ResourceSet ::=          SEQUENCE {
   nzp-CSI-RS-Resources             NZP-CSI-RS-ResourceSetId,
   nzp-CSI-ResourceSetId            SEQUENCE (SIZE
(1..maxNrofNZP-CSI-RS-ResourcesPerSet)) OF NZP-CSI-RS-ResourceId,
   repetition                       ENUMERATED { on, off }
   aperiodicTriggeringOffset        INTEGER (0..4)
   trs-Info                         ENUMERATED {true}
   ...
}
-- TAG-NZP-CSI-RS-RESOURCESET-STOP
-- ASN1STOP
```

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting. The time domain behavior may be periodic, aperiodic, or semi-persistent.

The CSI report configuration related information may be expressed as CSI-ReportConfig IE and Table 6 below shows an example of CSI-ReportConfig IE.

TABLE 6

```
-- ASN1START
-- TAG-CSI-RESOURCECONFIG-START
CSI-ReportConfig ::=             SEQUENCE {
   reportConfigId                CSI-ReportConfigId,
   carrier                       ServCellIndex         OPTIONAL, -
- Need S
   resourcesForChannelMeasurement        CSI-ResourceConfigId,
   csi-IM-ResourcesForInterference       CSI-ResourceConfigId  OPTIONAL, -
- Need R
```

TABLE 6-continued

| | |
|---|---|
| nzp-CSI-RS-ResourcesForInterference | CSI-ResourceConfigId OPTIONAL, - |
| - Need R | |
|   reportConfigType | CHOICE { |
|     periodic | SEQUENCE { |
|       reportSlotConfig | CSI- |
| ReportPeriodicityAndOffset, | |
|       pucch-CSI-ResourceList | SEQUENCE (SIZE |
| (1..maxNrofBWPs)) OF PUCCH-CSI-Resource | |
|     }, | |
|     semiPersistentOnPUCCH | SEQUENCE |
|       reportSlotConfig | CSI- |
| ReportPeriodicityAndoffset, | |
|       pucch-CSI-ResourceList | SEQUENCE (SIZE |
| (1..maxNrofBWPs)) OF PUCCH-CSI-Resource | |
|     }, | |
|     semiPersistentOnPUSCH | SEQUENCE { |
|       reportSlotConfig | ENUMERATED {s15, s110, s120, |
| s140, s180, s1160, s1320}, | |
|       reportSlotOffsetList | SEQUENCE (SIZE (1..maxNrofUL- |
| Allocations)) OF INTEGER (0..32), | |
|       p0alpha | P0-PUSCH-AlphaSetId |
|     }, | |
|     aperiodic | SEQUENCE { |
|       reportSlotOffsetList | SEQUENCE (SIZE (1..maxNrofUL- |
| Allocations)) OF INTEGER (0..32) | |
|     } | |
|   }, | |
|   reportQuantity | CHOICE { |
|     none | NULL, |
|     cri-RI-PMI-CQI | NULL, |
|     cri-RI-i1 | NULL, |
|     cri-RI-i1-CQI | SEQUENCE { |
|       pdsch-BundleSizeForCSI | ENUMERATED {n2, n4} |
| OPTIONAL | |
|     }, | |
|     cri-RI-CQI | NULL, |
|     cri-RSRP | NULL, |
|     ssb-Index-RSRP | NULL, |
|     cri-RI-LI-PMI-CQI | NULL |
| }, | |

The UE measures CSI based on configuration information related to the CSI (S720). The CSI measurement may include (1) a CSI-RS reception process of the UE (S721) and (2) a process of computing the CSI through the received CSI-RS (S722), and a detailed description thereof will be made below.

For the CSI-RS, resource element (RE) mapping is configured time and frequency domains by higher layer parameter CSI-RS-ResourceMapping.

Table 7 shows an example of CSI-RS-ResourceMapping IE.

TABLE 7

| | |
|---|---|
| -- ASNI START | |
| -- TAG-CSI-RS-RESOURCEMAPPING-START | |
| CSI-RS-ResourceMapping ::= | SEQUENCE { |
|   frequencyDomainAllocation | CHOICE { |
|     row1 | BIT STRING (SIZE (4)), |
|     row2 | BIT STRING (SIZE (12)), |
|     row4 | BIT STRING (SIZE (3)), |
|     other | BIT STRING (SIZE (6)) |
|   }, | |
|   nrofPorts | ENUMERATED {p1,p2, p4,p8,p12,p16,p24,p32}, |
|   firstOFDMSymbolInTimeDomain | INTEGER (0..13), |
|   firstOFDMSymbolInTimeDomain2 | INTEGER (2..12) |
|   cdm-Type | ENUMERATED {noCDM, |
| fd-CDM2, cdm4-FD2-TD2, cdm8-FD2-TD4}, | |
|   density | CHOICE { |
|     dot5 | ENUMERATED (evenPRBs, oddPRBs}, |
|     one | NULL, |
|     three | NULL, |

TABLE 7-continued

| | |
|---|---|
|     spare | NULL |
|   }, | |
|   freqBand | CSI-FrequencyOccupation, |
|   ... | |
| } | |

In Table 7, a density (D) represents a density of the CSI-RS resource measured in RE/port/physical resource block (PRB) and nrofPorts represents the number of antenna ports.

The UE reports the measured CSI to the BS (S730).

Here, when a quantity of CSI-ReportConfig of Table 6 is configured to 'none (or No report)', the UE may skip the report.

However, even when the quantity is configured to 'none (or No report)', the UE may report the measured CSI to the BS.

The case where the quantity is configured to 'none (or No report)' is a case of triggering aperiodic TRS or a case where repetition is configured.

Here, only in a case where the repetition is configured to 'ON', the report of the UE may be omitted.

CSI Measurement

The NR system supports more flexible and dynamic CSI measurement and reporting. In this case, the CSI measurement may include a procedure of receiving a CSI-RS and acquiring a CSI by computing the received CSI-RS.

As the time domain behavior of CSI measurement and reporting, aperiodic/semi-persistent/periodic CM (channel measurement) and IM (interference measurement) are supported. In order to configure the CSI-IM, a 4 port NZP CSI-RS RE pattern is used.

A CSI-IM-based IMR of the NR has a design similar to the CSI-IM of LTE and is configured independently from the ZP CSI-RS resources for PDSCH rate matching. Further, each port in NZP CSI-RS-based IMR, an interference layer having (a preferable channel and) a precoded NZP CSI-RS is emulated. This is about intra-cell interference measurement for a multi-user case and usually targets MU interference.

The base station transmits the precoded NZP CSI-RS to the terminal on each port of the configured NZP CSI-RS-based IMR.

The terminal assumes a channel/interference layer for each port in the resource set and measures interference.

For a channel, when there is no PMI and RI feedback, several resources are configured in a set, and a base station or a network indicates a subset of NZP CSI-RS resource for channel/interference measurement through the DCI.

Resource setting and resource setting configuration are described in more detail.

Resource Setting

Each CSI resource setting 'CSI-ResourceConfig' includes configuration for S≥1 CSI resource set (given by higher layer parameter csi-RS-ResourceSetList). The CSI resource setting corresponds to CSI-RS-resourcesetlist. In this case, S is the number of configured CSI-RS resource sets. In this case, configuration for S≥1 CSI resource set includes each CSI resource set including CSI-RS resources (composed of NZP CSI-RS or CSI-IM) and a SS/PBCH block (SSB) resource that is used for L1-RSRP computation.

Each CSI resource setting is positioned at a DL BWP (bandwidth part) identified by a higher layer parameter bwp-id. Further, all CSI resource settings linked to the CSI reporting setting have the same DL BWP.

The time domain behavior of a CSI-RS resource in the CSI resource setting included in the CSI-ResourceConfig IE is indicated by higher layer parameter resourceType and may be configured to be aperiodic, periodic, or semi-persistent. The number (S) of configured CSI-RS resource sets are limited to '1' for periodic and semi-persistent CSI resource settings. For periodic and semi-persistent CSI resource settings, the configured periodicity and slot offset are given by numerology of an associated DL BWP as being given by a bwp-id.

When a UE is configured by several CSI-ResourceConfigs including the same NZP CSI-RS resource ID, the same time domain behavior is configured for the CSI-ResourceConfig.

When a UE is configured by several CSI-ResourceConfigs including the same CSI-IM resource ID, the same time domain behavior is configured for the CSI-ResourceConfig.

Next, one or more CSI resource settings for channel measurement (CM) and interference measurement (IM) are configured through higher layer signaling.

CSI-IM resource for interference measurement.
NZP CSI-RS resource for interference measurement.
NZP CSI-RS resource for channel measurement.

That is, a CMR (channel measurement resource) may be an NZP CSI-RS for CSI acquisition and an IMR (Interference measurement resource) may be an NZP CSI-RS for CSI-IM and IM.

In this case, the CSI-IM (or ZP CSI-RS for IM) is generally used for inter-cell interference measurement.

Further, the NZP CSI-RS for IM is generally used for intra-cell interference measurement from multi-users.

The UE may assume that a CSI-RS resource(s) for channel measurement and a CSI-IM/NZP CSI-RS resource(s) for interference measurement configured for one CSI reporting are 'QCL-TypeD' for each resource.

Resource Setting Configuration

As described above, resource setting may mean a resource set list.

For an aperiodic CSI, each trigger state configured using higher layer parameter CSI-AperiodicTriggerState is associated with one or several CSI-ReportConfigs in which each CSI-ReportConfig is linked to periodic, semi-persistent, or aperiodic resource setting.

One reporting setting may be connected to maximally three resource settings.

When one resource setting is configured, resource setting (given by higher layer parameter resourcesForChannelMeasurement) is about channel measurement for L1-RSRP computation.

When two resource settings are configured, the first resource setting (given by higher layer parameter resourcesForChannelMeasurement) is for channel measurement and the second resource setting (given by csi-IM-ResourcesForInterference or nzp-CSI-RS-ResourcesForInterference) is for interference measurement that is performed on a CSI-IM or an NZP CSI-RS.

When three resource settings are configured, the first resource setting (given by resourcesForChannelMeasurement) is for channel measurement, the second resource setting (given by csi-IM-ResourcesForInterference) is for CSI-IM-based interference measurement, and the third resource setting (given by nzp-CSI-RS-ResourcesForInterference) is for NZP CSI-RS-based interference measurement.

Each CSI-ReportConfig is linked to periodic or semi-persistent resource setting for a Semi-persistent or periodic CSI.

When one resource setting (given by esourcesForChannelMeasurement) is configured, the resource setting is about channel measurement for L1-RSRP computation.

When two resource settings are configured, the first resource setting (given by esourcesForChannelMeasurement) is for channel measurement and the second resource setting (given by higher layer parameter csi-IM-ResourcesForInterference) is for interference measurement that is performed on a CSI-IM.

CSI Computation

When interference measurement is performed on a CSI-IM, each CSI-RS resource for channel measurement is associated with the CSI-IM resource by the sequence of CSI-RS resources and CSI-IM resources in a corresponding resource set. The number of the CSI-RS resources for channel measurement is the same as the number of the CSI-IM resources.

Further, when interference measurement is performed on NZP CSI-RS, the UE does not expect that it is set as one or more NZP CSI-RS resources in an associated resource set in resource setting for channel measurement.

When higher layer parameter nzp-CSI-RS-ResourcesForInterference is set, the terminal does not expect that 18 or more NZP CSI-RS ports are configured in the NZP CSI-RS resource set.

The terminal assumes the followings for CSI measurement.

Each NZP CSI-RS port configured for interference measurement corresponds to an interference transmission layer.

All the interference transmission layers of the NZP CSI-RS port for interference measurement consider an EPRE (energy per resource element) ratio.

Another interference signal, an NZP CSI-RS resource for interference measurement, or CSI-IM resource for interference measurement on the RE(s) of the NZP CSI-RS resource for channel measurement.

CSI Reporting

For CSI reporting, the time and frequency resources that the UE can use are controlled by a base station.

CSI (channel state information) may include at least one of a CQI (channel quality indicator), a PMI (precoding matrix indicator), a CRI (CSI-RS resource indicator), an SSBRI (SS/PBCH block resource indicator), an LI (layer indicator), an RI (rank indicator), or an L1-RSRP.

For the CQI, PMI, CRI, SSBRI, LI, RI, and L1-RSRP, the terminal is configured as N≥1 CSI-ReportConfig reporting setting, M≥1 CSI-ResourceConfig resource setting, and a list of one or more trigger states (provided by aperiodicTriggerStateList and semiPersistentOnPUSCH-TriggerStateList) by a higher layer. Each trigger state includes an associated CSI-ReportConfigs list that selectively indicates channels and resource set IDs for interference in the aperiodicTriggerStateList. Each trigger state includes one associated CSI-ReportConfig in semiPersistentOnPUSCH-TriggerStateList.

Further, the time domain behavior of CSI reporting supports periodic, semi-persistent, and aperiodic.

i) Periodic CSI reporting is performed on a short PUCCH and a long PUCCH. The periodicity and slot offset of periodic CSI reporting may be configured as an RRC and refers to an CSI-ReportConfig IE.

ii) SP(semi-periodic) CSI reporting is performed on a short PUCCH, a long PUCCH, or a PUSCH.

When an SP CSI is on Short/long PUCCHs, the periodicity and slot offset are set as an RRC and CSI reporting to a separate MAC CE is activated/deactivated.

When SP CSI is on a PUSCH, periodicity of SP CSI reporting is configured as an RRC, but the slot offset is not configured as the RRC, and SP CSI reporting is activated/deactivated by DCI (format 0_1). For SP CSI reporting on a PUSCH, a separated RNTI(SP-CSI C-RNTI) is used.

The initial CSI reporting timing follows a PUSCH time domain allocation value indicated in DCI, and the following CSI reporting timing follows periodicity configured as an RRC.

DCI format 0_1 includes a CSI request field and can activate/deactivate a specific configured SP-CSI trigger state. SP CSI reporting has activation/deactivation the same as or similar to the mechanism having data transmission on the SPS PUSCH.

iii) aperiodic CSI reporting is performed on the PUSCH and is triggered by the DCI.

For an AP CSI having an AP CSI-RS, the AP CSI-RS timing is configured by the RRC and the timing for AP CSI reporting is dynamically controlled by the DCI.

The NR does not employ the method of separately reporting CSI (for example, transmitting in sequence of RI, WB PMI/CQI, and SB PMI/CQI) in several reporting instances that have been applied to PUCCH-based CSI reporting. Instead, the NR limits specific CSI reporting not to be configured on the short/long PUCCHs, and a CSI omission rule is defined. Further, in relation to AP CSI reporting timing, PUSCH symbol/slot location is dynamically indicated by the DCI. Further, candidate slot offsets are configured by the RRC. For CSI reporting, slot offset(Y) is configured for each reporting setting. For UL-SCH, slot offset K2 is separately configured.

Two CSI latency classes (a low latency class and a high latency class) are defined in terms of CSI computation complexity. The low latency CSI is WB CSI including maximally 4 ports Type-I codebook or 4-ports non-PMI feedback CSI. The high latency CSI means another CSI except for the low latency CSI. For a normal terminal, (Z, Z') is defined in a unit of OFDM symbols. In this case, Z is the minimum CSI processing time until CSI reporting is performed after Aperiodic CSI triggering DCI is received. Further, Z' is the minimum CSI processing time until CSI reporting is performed after an CSI-RS for channel/interference is received.

Rel-15/16 Type II Codebook

Type II Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and the UE configured with higher layer parameter codebookType set to 'typeII'

The values of N, and N, are configured with the higher layer parameter $n_1$-$n_2$-codebookSubsetRestriction. A configuration of ($N_1$, $N_2$) supported for a given CSI-RS number and a corresponding value of ($O_1$, $O_2$) are predefined. $P_{CSI-RS}$ which is the number of CSI-RS ports is 2 $N_1$, $N_2$.

The value of L is configured with the higher layer parameter numberOfBeams, where L=2 when $P_{CSI-RS}$ and L∈(2, 3, 4) when $P_{CSI-RS}$>4.

The value of $N_{PSK}$ is configured with the higher layer parameter phaseAlphabetSize, where $N_{PSK}$∈{4, 8}.

The UE is configured with the higher layer parameter subbandAmplitude set to 'true' or 'false'.

The UE shall not report RI>2.

When υ≤2, where υ is the associated RI value, each PMI value corresponds to the codebook indices $i_1$ and $i_2$, where $i_1$ and $i_2$ satisfy the following equation.

$$i_1 = \begin{cases} [i_{1,1} \; i_{1,2} \; i_{1,3,1} \; i_{1,4,1}] & v = 1 \\ [i_{1,1} \; i_{1,2} \; i_{1,3,1} \; i_{1,4,1} \; i_{1,3,2} \; i_{1,4,2}] & v = 2 \end{cases}$$

$$i_2 = \begin{cases} [i_{2,1,1}] & subbandAmplitude = \text{'false'}, v = 1 \\ [i_{2,1,1} \; i_{2,1,2}] & subbandAmplitude = \text{'false'}, v = 2 \\ [i_{2,1,1} \; i_{2,2,1}] & subbandAmplitude = \text{'true'}, v = 1 \\ [i_{2,1,1} \; i_{2,2,1} \; i_{2,1,2} \; i_{2,2,2}] & subbandAmplitude = \text{'true'}, v = 2 \end{cases}$$

The L vectors combined by the codebook are identified by the indices $i_{1,1}$ and $i_{1,2}$, where $i_{1,1} = [q_1 \; q_2]$ $q_1 \in \{0, 1, ..., O_1 - 1\}$ $q_2 \in \{0, 1, ..., O_2 - 1\}$ $i_{1,2} \in \left\{0, 1, ..., \binom{N_1 N_2}{L} - 1\right\}$.

$n_1 = [n_1^{(0)}, ..., n_1^{(L-1)}]$ $n_2 = [n_2^{(0)}, ..., n_2^{(L-1)}]$ $n_1^{(i)} \in \{0, 1, ..., N_1 - 1\}$ $n_2^{(i)} \in \{0, 1, ..., N_2 - 1\}$ and,
When $$C(x, y) = \begin{cases} \binom{x}{y} & x \geq y \\ 0 & x < y \end{cases}$$

is assumed, a value of C(x,y) is given in Table 8.

Thereafter, elements of $n_1$ and $n_2$ are found as follows in $i_{1,2}$ by using an algorithm:

$s_{-1}=0$

For i=0, ..., L−1, largest $x^* \in \{L-1-i, \ldots, N_1N_2-1-i\}$ is found as follows in Table 8.

$i_{1,2} - s_{i-1} \geq C(x^*, L-i)$ $e_i = C(x^*, L-i)$ $s_i = s_{i-1} + e_i$ $n^{(i)} = N_1N_2 - 1 - x^*$ $n_1^{(i)} = n^{(i)} \bmod N_1$ $n_2^{(i)} = \dfrac{(n^{(i)} - n_1^{(i)})}{N_1}$ When $n_1$ and $n_2$ are known, $i_{1,2}$ may be found as follows. $n^{(i)}=N_1 n_2^{(i)}+n_1^{(i)}$. Here, so that $n^{(i)}$ becomes larger as i becomes larger, an index i=0, 1, ..., L−1 is allocated.

$$i_{1,2} = \sum_{i=0}^{L-1} C(N_1N_2 - 1 - n^{(i)}, L-i),$$

where C(x,y) is shown in Table 8.

For i=0, 1, ..., L−1, in the case of $N_2=1$, $q_2=0$, and $n_2^{(i)}=0$, $q_2$ is not reported.

In the case of $(N_1,N_2)=(2,1)$, $n_1=[0,1]$, and $n_2=[0,0]$, $i_{1,2}$ is not reported.

In the case of $(N_1,N_2)=(4,1)$, L=4, $n_1=[0, 1, 2, 3]$, and $n_2=[0, 0, 0, 0]$, $i_{1,2}$ is not reported.

In the case of $(N_1, N_2)=(2,2)$, L=4, $n_1=[0, 1, 0, 1]$, and $n_2=[0, 0, 1, 1]$, $i_{1,2}$ is not reported.

Table 8 below indicates combinatorial coefficients C(x, y).

TABLE 8

| x | y |  |  |  |
|---|---|---|---|---|
|   | 1 | 2 | 3 | 4 |
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | 15 | 105 | 455 | 1365 |

The strongest coefficient on layer l, l=1, ..., υ is identified by $i_{1,3,l} \in \{0, 1, \ldots, 2L-1\}$ Amplitude coefficient indicators $i_{1,4,l}$ and $i_{2,2,l}$ satisfy the following:

$i_{1,4,l}=[k_{l,0}^{(1)}, k_{l,1}^{(1)}, \ldots, k_{l,2L-1}^{(1)}]$ $i_{2,2,l}=[k_{l,0}^{(2)}, k_{l,1}^{(2)}, \ldots, k_{l,2L-1}^{(2)}]$ $k_{l,i}^{(1)} \in \{0,1,\ldots,7\}$ $k_{l,i}^{(2)} \in \{0,1\}$, where l=1, ..., υ.

Mapping to an amplitude coefficient $p_{l,i}^{(1)}$ from $k_{l,i}^{(1)}$ is given in Table 9, and mapping to an amplitude coefficient $p_{l,i}^{(2)}$ from $k_{l,i}^{(2)}$ is given in Table 10. The amplitude coefficients may be expressed as follows:

$p_l^{(1)}=[p_{l,0}^{(1)}, p_{l,1}^{(1)}, \ldots, p_{l,2L-1}^{(1)}]$ $p_l^{(2)}=[p_{l,0}^{(2)}, p_{l,1}^{(2)}, \ldots, p_{l,2L-1}^{(2)}]$, where l=1, ..., υ.

TABLE 9

| $k_{l,i}^{(1)}$ | $p_{l,i}^{(1)}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

TABLE 10

| $k_{l,i}^{(2)}$ | $p_{l,i}^{(2)}$ |
|---|---|
| 0 | $\sqrt{1/2}$ |
| 1 | 1 |

Phase coefficient indicators are $i_{2,1,l}=[c_{l,0}, c_{l,1}, \ldots, c_{l,2L-1}]$, and here, l=1, ..., υ.

The amplitude and phase coefficient indicators are reported as follows:

The indicators $k_{l,i_{1,3,l}}^{(1)}=7$, $k_{l,i_{1,3,l}}^{(2)}=1$, and $c_{l,i_{1,3,l}}=0$ (l=1, ..., υ). $k_{l,i_{1,3,l}}^{(1)}$, $k_{l,i_{1,3,l}}^{(2)}$, and $c_{l,i_{1,3,l}}$ are not reported for l=1, ..., υ.

The remaining 2L−1 elements of $i_{1,4,l}$ (l=1, ..., υ) are reported, where $k_{l,i}^{(1)} \in \{0, 1, \ldots, 71\}$. Let $M_l$ (l=1, ..., υ) be the number of elements of $i_{1,4,l}$ that satisfy $k_{l,i}^{(1)}>0$.

The remaining 2L−1 elements of $i_{2,1,l}$ and $i_{2,2,l}$ (l=1, ..., υ) are reported as follows:

When subbandAmplitude is set to 'false', $k_{l,i}^{(2)}=1$ for l=1, ..., υ, and i=0, 1, ..., 2L−1. $i_{2,2,l}$ is not reported for l=1, ..., υ.

For l=1, ..., υ, the elements of $i_{2,1,l}$ corresponding to the coefficients that satisfy $k_{l,i}^{(1)}>0$, i≠$i_{1,3,l}$, as determined by the reported elements of $i_{1,4,l}$, are reported, where $c_{l,i} \in \{0, 1, \ldots, N_{PSK}-1\}$ and the remaining 2L−$M_l$ elements of $i_{2,1,l}$ are not reported and are set to $c_{l,i}=0$.

When subbandAmplitude is set to 'true',

For l=1, ..., υ, the elements of $i_{2,2,l}$ and $i_{2,1,l}$ corresponding to the $\min(M_l, K^{(2)})-1$ strongest coefficients (excluding the strongest coefficient indicated by $i_{1,3,l}$), as determined by the corresponding reported elements of $i_{1,4,l}$, are reported, where $k_{l,i}^{(2)} \in \{0,1\}$ and $C_{l,i} \in \{0, 1, \ldots, N_{PSK}-1\}$. A value of $K^{(2)}$ is shown in Table 11. The remaining $2L-\min(M_l, K^{(2)})$ elements of $i_{2,2,l}$ are not reported and are set to $k_{l,i}^{(2)}=1$. The elements of $i_{2,1,l}$ corresponding to the $M_l-\min(M_l, K^{(2)})$ weakest non-zero coefficients are reported, where $c_{l,i} \in (0, 1, 2, 3)$. The remaining $2L-M_l$ elements of $i_{2,1,l}$ are not reported and are set to $C_{l,i}=0$ When two elements, $k_{l,x}^{(1)}$ and $k_{l,y}^{(1)}$, of the reported elements of $i_{1,4,l}$ are identical ($k_{l,x}^{(1)}=k_{l,y}^{(1)}$), then element $\min(x,y)$ is prioritized to be included in the set of the $\min(M_l, K^{(2)})-1$ strongest coefficients for $i_{2,1,l}$ and $i_{2,2,l}$ (l=1, ..., υ) reporting.

In Table 11, in a case where subbandAmplitude is configured to 'true', the case indicates full resolution subband coefficients.

TABLE 11

| L | $K^{(2)}$ |
|---|---|
| 2 | 4 |
| 3 | 4 |
| 4 | 6 |

Codebooks for layers 1-2 are given in Table 12, where indices $m_1^{(i)}$ and $m_2^{(i)}$ may be given as follows.

$$m_1^{(i)} = O_1 n_1^{(i)} + q_1$$

$$m_2^{(i)} = O_2 n_2 + q_2, \text{ where } i=0,1,\ldots,L-1.$$

$\varphi_{l,i}$, $u_m$, and $v_{l,m}$ are given as follows.

$$\varphi_{l,i} = \begin{cases} e^{j2\pi c_{l,i}/N_{PSK}} & subbandAmplitude =' \text{false}' \\ e^{j2\pi c_{l,i}/N_{PSK}} & subbandAmplitude =' \text{true}', \min(M_l, K^{(2)}) \text{ strongest} \\ & \text{coefficients (including } i_{1,3,l}) \text{ with } k_{l,i}^{(1)} > 0 \\ e^{j2\pi c_{l,i}/4} & subbandAmplitude =' \text{true}', M_l - \min(M_l, K^{(2)}) \text{ weakest} \\ & \text{coefficients with } k_{l,i}^{(1)} > 0 \\ 1 & subbandAmplitude =' \text{true}', 2L - M_l \text{ coefficients with} \\ & k_{l,i}^{(1)} = 0 \end{cases}$$

$$u_m = \begin{cases} \left[1 \quad e^{j\frac{2\pi m}{O_2 N_2}} \quad \ldots \quad e^{j\frac{2\pi m(N_2-1)}{O_2 N_2}}\right] & N_2 > 1 \\ 1 & N_2 = 1 \end{cases}$$

$$v_{l,m} = \left[u_m \quad e^{j\frac{2\pi l}{O_1 N_1}} u_m \quad \ldots \quad e^{j\frac{2\pi l(N_1-1)}{O_1 N_1}} u_m\right]^T$$

Table 12 below shows codebooks for 1-layer and 2-layer using antenna ports 3000 to $2999+P_{CSI-RS}$.

TABLE 12

| Layers |
|---|
| $\upsilon = 1 \quad W_{q_1,q_2,n_1,n_2,p_1^{(1)},p_1^{(2)},i_{2,1,1}}^{(1)} = W_{q_1,q_2,n_1,n_2,p_1^{(1)},p_1^{(2)},i_{2,1,1}}^{1}$ |
| $\upsilon = 2 \quad W_{q_1,q_2,n_1,n_2,p_1^{(1)},p_1^{(2)},i_{2,1,1},p_2^{(1)},p_2^{(2)},i_{2,1,2}}^{(2)} = \frac{1}{\sqrt{2}}\left[W_{q_1,q_2,n_1,n_2,p_1^{(1)},p_1^{(2)},i_{2,1,1}}^{1} \quad W_{q_1,q_2,n_1,n_2,p_2^{(1)},p_2^{(2)},i_{2,1,2}}^{2}\right]$ |
| where $W_{q_1,q_2,n_1,n_2,p_l^{(1)},p_l^{(2)},c_l}^{l} = \frac{1}{\sqrt{N_1 N_2 \sum_{i=0}^{2L-1}(p_{l,i}^{(1)} p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}, l = 1, 2,$ |
| and the mappings from $i_1$ to $q_1, q_2, n_1, n_2, p_1^{(1)}$, and $p_2^{(1)}$, and from $i_2$ to $i_{2,1,1}, i_{2,1,2}, p_1^{(2)}$ and $p_2^{(2)}$ are as described above, including the ranges of the constituent indices of $i_1$ and $i_2$. |

When the UE is configured with higher layer parameter codebookType set to 'typeII', the bitmap parameter typeII-RI-Restriction forms the bit sequence $r_1, r_0$ where $r_0$ is the LSB and $r_1$ is the MSB. When $r_i$ is zero, i∈ {0,1}, PMI an RI reporting are not allowed to correspond to any precoder associated with υ=i+1 layers. The bitmap parameter n1-n2-codebookSubsetRestriction forms the bit sequence $B=B_1 B_2$ where bit sequences $B_1$, and $B_2$ are concatenated to form B. In order to define $B_1$ and $B_2$, first, $O_1 O_2$ vector groups $G(r1,r2)$ are defined as follows.

$$G(r_1, r_2) = \{v_{N_1 r_1 + x_1, N_2 r_2 + x_2} : x_1 = 0, 1, \ldots, N_1 - 1; x_2 = 0, 1, \ldots, N_2 - 1\},$$

$$\text{where } \begin{matrix} r_1 \in \{0, 1, \ldots O_{,1} - 1\} \\ r_2 \in \{0, 1, \ldots, O_2 - 1\} \end{matrix}.$$

The UE should configure limits for the 4 vector groups indicated by $(r_1^{(k)}, r_2^{(k)})$ (k=1, 2, 3). The four vector groups are identified by the following group indices.

$g^{(k)} = O_1 r_2^{(k)} + r_1^{(k)}$ where k=0, 1, . . . , 3 The indices are assigned such that $g^{(k)}$ increases as k increases. The remaining vector groups are not restricted.

If $N_2=1$, $g^{(k)}$ for k=0, 1, . . . , 3, and $B_1$ is empty.

If $N_2>1$, $B_1 = b_1^{(10)} \ldots b_1^{(0)}$ is the binary representation of the integer $\beta_1$ where $b_1^{(10)}$ is the MSB and $b_1^{(0)}$ is the LSB. Here, $b_1^{(10)}$ is MSB and $b_1^{(0)}$ is LSB. $\beta_1$ may be found by using the following equation.

$$\beta_1 = \sum_{k=0}^{3} C(O_1 O_2 - 1 - g^{(k)}, 4 - k),$$

here, C(x,y) is defined in Table 8. Group indices $g^{(k)}$ and indicators $(r_1^{(k)}, r_2^{(k)})$ (k=0, 1, 2, 3) may be found from $\beta_1$ using the following algorithm.

$s_{-1} = 0$, k=0, . . . ,3,

The largest $x^* \in \{3-k, \ldots, O_1 O_2 - 1 - k\}$ is found as follows.

$\beta_1 - s_{k-1} \geq C(x^*, 4-k)$ $e_k = C(x^*, 4-k)$ $s_k = s_{k-1} + e_k$ $g^{(k)} = O_1 O_2 - 1 - x^*$ $r_1^{(k)} = g^{(k)} \bmod O_1$ $r_2^{(k)} = \frac{(g^{(k)} - r_1^{(k)})}{O_1}$ The bit sequence $B_2 = B_2^{(0)} B_2^{(1)} B_2^{(2)} B_2^{(3)}$ is the concatenation of the bit sequences $B_2^{(k)}$ for k=0, 1, . . . , 3 corresponding to the group indices $g^{(k)}$. The bit sequence $B_2^{(k)}$ is defined as following.

$B_2^{(k)} = b_2^{(k, 2N_1N_2-1)} \ldots b_2^{(k,0)}$

Bits $b_2^{(k,2(N_1 x_2 + x_1)+1)} b_2^{(k,2(N_1 x_2 + x_1))}$ indicate the maximum allowed amplitude coefficient $p_{l,i}^{(1)}$ for the vector in group $g^{(k)}$ indexed by $x_1, x_2$, where the maximum amplitude coefficients are given in Table 13. A UE that does not report parameter amplitudeSubsetRestriction='supported' in its capability signaling is not expected to be configured with $b_2^{(k,2(N_1 x_2 + x_1)+1)} b_2^{(k,2(N_1 x_2 + x_1))} = 01$ or 10.

Table 13 below shows maximum allowed amplitude coefficients for restricted vectors.

TABLE 13

| Bits $b_2^{(k, 2(N_1 x_2 + x_1)+1)}$ $b_2^{(k, 2(N_1 x_2 + x_1))}$ | Maximum Amplitude Coefficient $p_{l,i}^{(1)}$ |
|---|---|
| 00 | 0 |
| 01 | $\sqrt{1/4}$ |
| 10 | $\sqrt{1/2}$ |
| 11 | 1 |

Type II Port Selection Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and the UE configured with higher layer parameter codebookType set to 'typeII-PortSelection'

The number of CSI-RS ports is given by $P_{CSI-RS} \in \{4,8,12,16,24,32\}$ as configured by higher layer parameter nrofPorts.

The value of L is configured with the higher layer parameter numberOfBeams, where L=2 when $P_{CSI-RS}=4$ and $L \in \{2, 3, 4\}$ when $P_{CSI-RS}>4$.

The value of d is configured with the higher layer parameter portSelectionSamplingSize, where $d \in \{1, 2, 3, 4\}$ and $$d \leq \min\left(\frac{P_{CSI-RS}}{2}, L\right).$$

The value of $N_{PSK}$ is configured with the higher layer parameter phaseAlphabetSize, where $N_{PSK} \in \{4,8\}$.

The UE is configured with the higher layer parameter subbandAmplitude set to 'true' or 'false'.

The UE shall not report RI>2.

The UE is also configured with the higher layer parameter typeII-PortSelectionRI-Restriction. The bitmap parameter typeII-PortSelectionRI-Restriction forms the bit sequence $r_1, r_0$ where $r_0$ is the LSB and $r_1$ is the MSB. When $r_i$ is zero, $i \in \{0,1\}$, PMI and RI reporting are not allowed to correspond to any precoder associated with $\upsilon = i+1$ layers.

When $\upsilon \leq 2$, where $\upsilon$ is the associated RI value, each PMI value corresponds to the codebook indices $i_1$ and $i_2$, and satisfies the following equation.

$i_1 = \begin{cases} [i_{1,1} \; i_{3,1} \; i_{4,1}] & \upsilon = 1 \\ [i_{1,1} \; i_{3,1} \; i_{4,1} \; i_{3,2} \; i_{4,2}] & \upsilon = 2 \end{cases}$ $i_2 = \begin{cases} [i_{2,1,1}] & subbandAmplitude = \text{'false'}, \upsilon = 1 \\ [i_{2,1,1} \; i_{2,1,2}] & subbandAmplitude = \text{'false'}, \upsilon = 2 \\ [i_{2,1,1} \; i_{2,2,1}] & subbandAmplitude = \text{'true'}, \upsilon = 1 \\ [i_{2,1,1} \; i_{2,2,1} \; i_{2,1,2} \; i_{2,2,2}] & subbandAmplitude = \text{'true'}, \upsilon = 1 \end{cases}$ The L antenna ports per polarization are selected by the index $i_{1,l}$, where $$i_{1,1} \in \left\{0, 1, \ldots, \left\lceil \frac{P_{CSI-RS}}{2d} \right\rceil - 1\right\}.$$

The strongest coefficient on layer l, l=1, . . . , $\upsilon$ is identified by $i_{1,3,l} \in \{0, 1, \ldots, 2L-1\}$.

Amplitude coefficients indicators satisfy $i_{1,4,l}$ and $i_{2,2,l}$.

$i_{1,4,l} = [k_{l,0}^{(1)}, k_{l,1}^{(1)}, \ldots, k_{l,2L-1}^{(1)}]$ $i_{2,2,l} = [k_{l,0}^{(2)}, k_{l,1}^{(2)}, \ldots, k_{l,2L-1}^{(2)}]$ $k_{l,i}^{(1)} \in \{0, 1, \ldots, 7\}$ $k_{l,i}^{(2)} \in \{0,1\}$, where $l=1, \ldots, \upsilon$.

The mapping from $k_{l,i}^{(1)}$ to the amplitude coefficient $p_{l,i}^{(1)}$ is given in Table 9 and the mapping from $k_{l,i}^{(2)}$ to the amplitude coefficient $p_{l,i}^{(2)}$ is given in Table 10. The amplitude coefficients may be expressed as follows.

$$p_l^{(1)}=[p_{l,0}^{(1)},p_{l,1}^{(1)},\ldots,p_{l,2L-1}^{(1)}]$$

$$p_l^{(2)}=[p_{l,0}^{(2)},p_{l,1}^{(2)},\ldots,p_{l,2L-1}^{(2)}], \text{ where } l=1,\ldots,\upsilon.$$

The phase coefficient indicators are $i_{2,1,l}=[c_{l,0}, c_{l,1}, \ldots, c_{l,2L-1}]$ where $l=1,\ldots,\upsilon$.

The amplitude and phase coefficient indicators are reported as follows:

The indicators $k_{l,i_{1,3,l}}^{(1)}=7$, $k_{l,i_{1,3,l}}^{(2)}=1$, and $c_{l,i_{1,3,l}}=0$ ($l=1,\ldots,\upsilon$). $k_{l,i_{1,3,l}}^{(1)}$, $k_{l,i_{1,3,l}}^{(2)}$, and $c_{l,i_{1,3,l}}$ are not reported for $l=1,\ldots,\upsilon$.

The remaining 2L−1 elements of $i_{1,4,l}$ ($l=1,\ldots,\upsilon$) are reported, where $k_{l,j}^{(1)} \in \{0, 1, \ldots, 7\}$. Let $M_l$, ($l=1,\ldots,\upsilon$) be the number of elements of $i_{1,4,l}$ that satisfy $k_{l,i}^{(1)}>0$ The remaining 2L−1 elements of $i^{2,1,l}$ and $i_{2,2,l}$ ($l=1,\ldots,\upsilon$) are reported as follows:

When subbandAmplitude is set to 'false', $k_{l,i}^{(2)}=1$ for $l=1,\ldots,\upsilon$, and $i=0, 1, \ldots, 2L-1$. $i_{2,2,l}$ is not reported for $l=1,\ldots,\upsilon$.

For $l=1,\ldots,\upsilon$, the elements of $i_{2,2,l}$ and $i_{2,1,l}$ corresponding to the coefficients that satisfy $k_{l,i}^{(1)} \geq 0$, $i \neq i_{1,3,l}$ as determined by the reported elements of $i_{1,4,l}$, are reported, where $c_{l,i} \in \{0, 1, \ldots, N_{PSK}-1\}$ and the remaining $2L-M_l$ elements of $i_{2,1,l}$ are not reported and are set to $c_{l,i}=0$.

When subbandAmplitude is set to 'true',

For $l=1,\ldots,\upsilon$, the elements of $i_{2,2,l}$ and $i_{2,1,l}$ corresponding to the $\min(M_l,K^{(2)})-1$ strongest coefficients (excluding the strongest coefficient indicated by $i_{1,3,l}$), as determined by the corresponding reported elements of $i_{1,4,l}$, are reported, where $k_{l,i}^{(2)} \in \{0,1\}$ and $c_{l,i} \in \{0, 1, \ldots, N_{PSK}-1\}$. The values of $K^{(2)}$ are given in Table 11. The remaining $2L-\min(M_l,K^{(2)})$ elements of $i_{2,2,l}$ are not reported and are set to $k_{l,i}^{(2)}=1$. The elements of $i_{2,1,l}$ corresponding to the $M_l-\min(M_l, K^{(2)})$ weakest non-zero coefficients are reported, where $c_{l,i} \in \{0,1,2,3\}$. The remaining $2L-M_l$ elements of $i_{2,1,l}$ are not reported and are set to $c_{l,i}=0$.

When two elements, $k_{l,x}^{(1)}$ and $k_{l,y}^{(1)}$, of the reported elements of $i_{1,4,l}$ are identical ($k_{l,x}^{(1)}=k_{l,y}^{(1)}$) then element $\min(x, y)$ is prioritized to be included in the set of the $\min(M_l,K^{(2)})-1$ strongest coefficients for $i_{2,1,l}$ and $i_{2,2,l}$ ($l=1,\ldots,\upsilon$) reporting.

The codebooks for 1-2 layers are given in Table 5.2.2.2.4-1, where the quantity $\varphi_{l,i}$ is given by $$\varphi_{l,i} = \begin{cases} e^{j2\pi c_{l,i}/N_{PSK}} & \text{subbandAmplitude = 'false'} \\ e^{j2\pi c_{l,i}/N_{PSK}} & \text{subbandAmplitude = 'true'}, \min(M_l, K^{(2)}) \\ & \text{strongest coefficients (including } i_{1,3,l}\text{) with } k_{l,i}^{(1)} > 0 \\ e^{j2\pi c_{l,i}/4} & \text{subbandAmplitude = 'true'}, M_l - \min(M_l, K^{(2)}) \\ & \text{weakest coefficients with } k_{l,i}^{(1)} > 0 \\ 1 & \text{subbandAmplitude = 'true'}, 2L - M_l \text{ coefficients with } \\ & k_{l,i}^{(1)} = 0 \end{cases}$$

And $v_m$ is a $P_{CSI-RS}/2$-element column vector containing a value of 1 in element ($m \bmod P_{CSI-RS}/2$) and zeros elsewhere (where the first element is element 0).

Table 14 below shows codebooks for 1-layer and 2-layer using an antenna port 3000~2999+PCSI-RS.

TABLE 14

| Layers |
|---|
| $\upsilon = 1$    $W_{i_{1,1},p_1^{(1)}, p_1^{(2)},i_{2,1,1}}^{(1)} = W_{i_{1,1},p_1^{(1)}, p_1^{(2)},i_{2,1,1}}^{1}$ |
| $\upsilon = 2$    $W_{i_{1,1},p_1^{(1)},p_1^{(2)},i_{2,1,1}p_2^{(1)},p_2^{(2)},i_{2,1,2}}^{(2)} = \frac{1}{\sqrt{2}}\left[W_{i_{1,1},p_1^{(1)},p_1^{(2)},i_{2,1,1}}^{1} \quad W_{i_{1,1},p_2^{(1)},p_2^{(2)},i_{2,1,2}}^{2}\right]$ |
| where |
| $W_{i_{1,1},p_l^{(1)},p_l^{(2)},i_{2,1,l}}^{l} = \frac{1}{\sqrt{\sum_{i=0}^{2L-1}(p_{l,i}^{(1)}p_{l,i}^{(2)})^2}} \begin{bmatrix} \sum_{i=0}^{L-1} v_{i_{1,1}d+i} p_{l,i}^{(1)} p_{l,i}^{(2)} \varphi_{l,i} \\ \sum_{i=0}^{L-1} v_{i_{1,1}d+i} p_{l,i+L}^{(1)} p_{l,i+L}^{(2)} \varphi_{l,i+L} \end{bmatrix}, l = 1, 2,$ |
| and the mappings from $i_1$ to $i_{1,1}$, $p_1^{(1)}$, and $p_2^{(1)}$ from $i_2$ to $i_{2,1,1}$, $i_{2,1,2}$, $p_1^{(2)}$, and $p_2^{(2)}$ are as described above, including the ranges of the constituent indices of $i_1$ and $i_2$. |

Enhanced Type II Codebook

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and UE configured with higher layer parameter codebookType set to 'typeII-r16'

The values of $N_1$ and $N_2$ are configured with the higher layer parameter n1-n2-codebookSubsetRestriction-r16. A configuration of ($N_1$, $N_2$) supported for a given CSI-RS number and a corresponding value of ($O_1$, $O_2$) are predefined. The number of CSI-RS ports, $P_{CSI-RS}$, is $2N_1N_2$.

The values of L, β and $p_\upsilon$ are determined by the higher layer parameter paramCombination-r16, where the mapping is given in Table 15.

The UE does not expect that the following paramCombination-r16 is to be configured.

3, 4, 5, 6, 7, or 8 when $P_{CSI-RS}=4$, 7 or 8 when $P_{CSI-RS}<32$ 7 or 8 when higher layer parameter typeII-RI-Restriction-r16 is configured with $r_i=1$ for any $i>1$.

7 or 8 when R=2.

The parameter R is configured with the higher-layer parameter numberOfPMI-SubbandsPerCQI-Subband. This parameter controls the total number of precoding matrices $N_3$ indicated by the PMI as a function of the number of configured subbands in csi-ReportingBand. The subband size is configured as the number of PRBs in a bandwidth part by a high-level parameter subband size.

When R=1:

One precoding matrix is indicated by the PMI for each subband in csi-ReportingBand.

When R=2:

For each subband in csi-ReportingBand that is not the first or last subband of a BWP, two precoding matrices are indicated by the PMI: the first precoding matrix corresponds to the first $N_{PRB}^{SB}/2$ PRBs of the subband and the second precoding matrix corresponds to the last $N_{PRB}^{SB}/2$ PRBs of the subband.

For each subband in csi-ReportingBand that is the first or last subband of a BWP If $$\left(N_{BWP,i}^{start} \bmod N_{PRB}^{SB}\right) \geq \frac{N_{PRB}^{SB}}{2},$$

one precoding matrix is indicated by the PMI corresponding to the first subband. If $$\left(N_{BWP,i}^{start} \bmod N_{PRB}^{SB}\right) < \frac{N_{PRB}^{SB}}{2},$$

two precoding matrices are indicated by the PMI corresponding to the first subband: the first precoding matrix corresponds to the first $$\frac{N_{PRB}^{SB}}{2} - \left(N_{BWP,i}^{start} \bmod N_{PRB}^{SB}\right)$$

PRBs of the first subband and the second precoding matrix corresponds to the last $$\frac{N_{PRB}^{SB}}{2}$$

PRBs of the first subband.

If $$1 + \left(N_{BWP,i}^{start} + N_{BWP,i}^{size} - 1\right) \bmod N_{PRB}^{SB} \leq \frac{N_{PRB}^{SB}}{2},$$

one precoding matrix is indicated by the PMI corresponding to the last subband. If $$1 + \left(N_{BWP,i}^{start} + N_{BWP,i}^{size} - 1\right) \bmod N_{PRB}^{SB} > \frac{N_{PRB}^{SB}}{2},$$

two precoding matrices are indicated by the PMI corresponding to the last subband: the first precoding matrix corresponds to the first $$\frac{N_{PRB}^{SB}}{2}$$

PRBs of the last subband and the second precoding matrix corresponds to the last $$1 + \left(N_{BWP,i}^{start} + N_{BWP,i}^{size} - 1\right) \bmod N_{PRB}^{SB} - \frac{N_{PRB}^{SB}}{2}$$

PRBs of the last subband.

Table 15 shows codebook parameter configurations for L, β, and $p_\upsilon$.

TABLE 15

| paramCombination-r16 | L | $p_\upsilon$ v ∈ {1, 2} | $p_\upsilon$ v ∈ {3, 4} | β |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |

The UE shall report the RI value v according to the configured higher layer parameter typeII-RI-Restriction-r16. The UE shall not report $\upsilon > 4$.

A PMI value corresponds to codebook indices $i_1$ and $i_2$, and satisfies the following equation.

$$i_1 = \begin{cases} [i_{1,1} \; i_{1,5} \; i_{1,6,1} \; i_{1,7,1} \; i_{1,8,1}] & \upsilon = 1 \\ [i_{1,1} \; i_{1,5} \; i_{1,6,1} \; i_{1,7,1} \; i_{1,8,1} \; i_{1,6,2} \; i_{1,7,2} \; i_{1,8,2}] & \upsilon = 2 \\ [i_{1,1} \; i_{1,5} \; i_{1,6,1} \; i_{1,7,1} \; i_{1,8,1} \; i_{1,6,2} \; i_{1,7,2} \; i_{1,8,2} \; i_{1,6,3} \; i_{1,7,3} \; i_{1,8,3}] & \upsilon = 3 \\ [i_{1,1} \; i_{1,5} \; i_{1,6,1} \; i_{1,7,1} \; i_{1,8,1} \; i_{1,6,2} \; i_{1,7,2} \; i_{1,8,2} \; i_{1,6,3} \; i_{1,7,3} \; i_{1,8,3} \; i_{1,6,4} \; i_{1,7,4} \; i_{1,8,4}] & \upsilon = 4 \end{cases}$$

$$i_2 = \begin{cases} [i_{2,3,1} \; i_{2,4,1} \; i_{2,5,1}] & \upsilon = 1 \\ [i_{2,3,1} \; i_{2,4,1} \; i_{2,5,1} \; i_{2,3,2} \; i_{2,4,2} \; i_{2,5,2}] & \upsilon = 2 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3}] & \upsilon = 3 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3} \; i_{2,3,4} \; i_{2,4,4} \; i_{2,5,4}] & \upsilon = 4 \end{cases}$$

The precoding matrices indicated by the PMI are determined from $L+M_\upsilon$ vectors.

L vectors $v_{m_1^{(i)}, m_2^{(i)}}$, i=0, 1, . . . , L−1 are identified by indices $q_1$, $q_2$, $n_1$, $n_2$ indicated by the $i_{1,1}$, $i_{1,2}$, here, C(x,y) is given in Table 18.

$$M_\upsilon = \left\lceil p_\upsilon \frac{N_3}{R} \right\rceil$$

vectors, $[y_{0,l}^{(f)}, y_{1,l}^{(f)}, \ldots, y_{N_3-1,l}^{(f)}]^T$, f=0, 1, . . . , $M_\upsilon-1$, are identified by $M_{initial}$ (for $N_3 > 19$) and $n_{3,l}$ (l=1, . . . , $\upsilon$) where $M_{initial} \in \{-2M_\upsilon+1, -2M_\upsilon+2, \ldots, 0\}$ $n_{3,l} = [n_{3,l}^{(0)}, \ldots, n_{3,l}^{(M_\upsilon-1)}]$ $n_{3,l}^{(f)} \in \{0,1, \ldots, N_3-1\}$ which are indicated by means of the indices $i_{1,5}$ (for $N_3 > 19$) and $i_{1,6,l}$ (for $M_\upsilon > 1$ and l=1, . . . , $\upsilon$), where $i_{1,5} \in \{0,1, \ldots, 2M_\upsilon-1\}$ $$i_{1,6,l} \in \begin{cases} \{0,1,\ldots,\binom{N_3-1}{M_\upsilon-1}-1\} & N_3 \leq 19 \\ \{0,1,\ldots,\binom{2M_\upsilon-1}{M_\upsilon-1}-1\} & N_3 > 19 \end{cases}.$$

Amplitude coefficient indicators $i_{2,3,l}$ and $i_{2,4,l}$ satisfy the following:

$$i_{2,3,l}=[k_{l,0}^{(1)} k_{l,1}^{(1)}]$$

$$i_{2,4,l}=[k_{l,0}^{(2)} \ldots k_{l,M_\upsilon-1}^{(2)}]$$

$$k_{l,f}^{(2)}=[k_{l,0,f}^{(2)} \ldots k_{l,2L-1,f}^{(2)}]$$

$$k_{l,p}^{(1)} \in \{1,\ldots,15\}$$

$$k_{l,i,f}^{(2)} \in \{0,\ldots,7\}$$

Where $l=1, \ldots, \upsilon$.

A phase coefficient indicator $i_{2,5,l}$ satisfies the following:

$$i_{2,5,l}=[c_{l,0} \ldots c_{l,M_\upsilon-1}]$$

$$c_{l,f}=[c_{l,0,f} \ldots c_{l,2L-1,f}]$$

$$c_{l,i,f} \in \{0,\ldots,15\}$$

Where $l=1,\ldots,\upsilon$.

Let $K_0 = \lceil \beta 2LM_1 \rceil$. The bitmap whose nonzero bits identify which coefficients in $i_{2,4,l}$ and $i_{2,5,l}$ are reported, is indicated by $i_{1,7,l}$ $$i_{1,7,l}=[k_{l,0}^{(3)} \ldots k_{l,M_\upsilon-1}^{(3)}]$$

$$k_{l,f}^{(3)}=[k_{l,0,f}^{(3)} \ldots k_{l,2L-1,f}^{(3)}]$$

$$k_{l,i,f}^{(3)} \in \{0,1\}$$

for $l=1,\ldots,\upsilon$, such that $K_l^{NZ} = \Sigma_{i=0}^{2L-1} \Sigma_{f=0}^{M_\upsilon-1} k_{l,i,f}^{(3)} \leq K_0$ is the number of nonzero coefficients for layer $l=1,\ldots,\upsilon$ and $K^{NZ} = \Sigma_{l=1}^{\upsilon} K_l^{NZ} \leq 2K_0$ is the total number of nonzero coefficients.

The indices of $i_{2,4,l}$, $i_{2,5,l}$ and $i_{1,7,l}$ are associated to the $M_\upsilon$ codebook indices in $n_{3,l}$.

The mapping from $k_{l,p}^{(1)}$ to the amplitude coefficient $p_{l,p}^{(1)}$ is given in Table 16 and the mapping from $k_{l,i,f}^{(2)}$ to the amplitude coefficient $p_{l,i,f}^{(2)}$ is given in Table 17. The amplitude coefficients are represented by following.

$$p_l^{(1)}=[p_{l,0}^{(1)} \ p_{l,1}^{(1)}]$$

$$p_l^{(2)}=[p_{l,0}^{(2)} \ldots p_{l,M_\upsilon-1}^{(2)}]$$

$$p_{l,f}^{(2)}=[p_{l,0,f}^{(2)} \ldots p_{l,2L-1,f}^{(2)}]$$

where, $l=1,\ldots,\upsilon$.

$f^*_l \in \{0, 1, \ldots, M_\upsilon-1\}$ is an index of $i_{2,4,l}$, and $i^*_l \in \{0, 1, \ldots, 2l L-1\}$ is an index of $k_{l,f^*_l}^{(2)}$ for identifying a strongest coefficient of layer-1, that is, an element $k_{l,i^*_l,f^*_l}^{(2)}$ of $i_{2,4,l}$ (for $i=0, 1, \ldots, 2L-1$), $f=0, 1, \ldots, M_\upsilon-1$.

The codebook indices of $n_{3,l}k_{m_i}$ are remapped with respect to $n_{3,l}^{(f^*i)}$ as $n_{3,l}^{(f)}=(n_{3,l}^{(f)}-n_{3,l}^{(f^*i)}) \bmod N_3 k_{m_i}^*=0$, such that $n_{3,l}^{(f^*i)}=0$, after remapping. The index $f$ is remapped with respect to $f^*_l$ as $f=(f-f^*_l) \bmod M_\upsilon$, such that the index of the strongest coefficient is $f^*_l=0$ ($l=1, \ldots, \upsilon$), after remapping.

The indices of $i_{2,4,l}$, $i_{2,5,l}$ and $i_{1,7,l}$ indicate amplitude coefficients, phase coefficients and bitmap after remapping.

The strongest coefficient of layer $l$ is identified by $i_{1,8,l} \in \{0, 1, \ldots, 2l L-1\}$, which is obtained as follows $$i_{1,8,l} = \begin{cases} \Sigma_{k=0}^{i^*_l} k_{l,i,0}^{(3)} - 1 & \upsilon = 1 \\ i^*_l & 1 < \upsilon \leq 4 \end{cases}$$

where, $l=1,\ldots,\upsilon$.

Table 16 shows mapping ($k_{l,p}^{(1)}$ to $p_{l,p}^{(1)}$) of elements of $i_{2,3,l}$.

TABLE 16

| $k_{l,p}^{(1)}$ | $p_{l,p}^{(1)}$ |
| --- | --- |
| 0 | Reserved |
| 1 | $\frac{1}{\sqrt{128}}$ |
| 2 | $\left(\frac{1}{8192}\right)^{1/4}$ |
| 3 | $\frac{1}{8}$ |
| 4 | $\left(\frac{1}{2048}\right)^{1/4}$ |
| 5 | $\frac{1}{2\sqrt{8}}$ |
| 6 | $\left(\frac{1}{512}\right)^{1/4}$ |
| 7 | $\frac{1}{4}$ |
| 8 | $\left(\frac{1}{128}\right)^{1/4}$ |
| 9 | $\frac{1}{\sqrt{8}}$ |
| 10 | $\left(\frac{1}{32}\right)^{1/4}$ |
| 11 | $\frac{1}{2}$ |
| 12 | $\left(\frac{1}{8}\right)^{1/4}$ |
| 13 | $\frac{1}{\sqrt{2}}$ |
| 14 | $\left(\frac{1}{2}\right)^{1/4}$ |
| 15 | 1 |

The amplitude and phase coefficient indicators are reported as follows:

$$k_{l,\lfloor\frac{i^*_l}{L}\rfloor}^{(1)} = 15,$$

$k_{l,i^*_l,0}^{(2)}=7$, $k_{l,i^*_l,0}^{(3)}=1$ and $c_{l,i^*_l,0}=0$ ($l=1,\ldots,\upsilon$). The indicators $$k_{l,\lfloor\frac{i^*_l}{L}\rfloor}^{(1)},$$

$k_{l,i^*_l,0}^{(2)}$ and $c_{l,i^*_l,0}$ are not reported for $l=1,\ldots,\upsilon$.

The indicator $$k_{l\left(\left\lfloor \frac{i_L^*}{L}\right\rfloor+2\right) \bmod 2}^{(1)}$$

is reported for l=1, ..., $\upsilon$.

The $K^{NZ}-\upsilon$ indicators $k_{l,i,f}^{(2)}$ for which $k_{l,i,f}^{(3)}=1$, $i \neq i^*_l$, $f \neq 0$ are reported.

The $K^{NZ}-\upsilon$ indicators $c_{l,i,f}$ for which $k_{l,i,f}^{(3)}=1$, $i \neq i^*_l$, $f \neq 0$ are reported.

The remaining $2L \cdot M_\upsilon \cdot \upsilon - K^{NZ}$ indicators $k_{l,i,f}^{(2)}$ are not reported.

The remaining $2L \cdot M_\upsilon \cdot \upsilon - K^{NZ}$ indicators $c_{l,i,f}$ are not reported.

Table 17 shows mapping ($k_{l,i,f}^{(2)}$ to $p_{l,i,f}^{(2)}$) of elements of $i_{2,4,l}$.

TABLE 17

| $k_{l,i,f}^{(2)}$ | $p_{l,i,f}^{(2)}$ |
|---|---|
| 0 | $\frac{1}{8\sqrt{2}}$ |
| 1 | 1/8 |
| 2 | $\frac{1}{4\sqrt{2}}$ |
| 3 | 1/4 |
| 4 | $\frac{1}{2\sqrt{2}}$ |
| 5 | 1/2 |
| 6 | $\frac{1}{\sqrt{2}}$ |
| 7 | 1 |

Elements of $n_1$ and $n_2$ may be found from $i_{1,2}$ by using the algorithm, where the value of C(x,y) is shown in Table 18.

For $N_3 > 19$, $M_{initial}$ is identified by $i_{1,5}$.

$n_{3,l}^{(0)}=0$ for all values of $N_3$ (l=1, ..., $\upsilon$). Non-zero elements of $n_{3,l}$ identified by $n_{3,l}^{(1)}$, ..., $n_{3,l}^{(M_\upsilon-1)}$ may be found from $i_{1,6,l}$ (l=1, ..., $\upsilon$) with respect to $N_3 \leq 19$, and found as follows from $i_{1,6,l}$ (l=1, ..., $\upsilon$) and $M_{initial}$ with respect to $N_3 > 19$ by using the C(x,y) and algorithm:

```
s_0 = 0
for f = 1, ..., M_υ - 1
  Find the largest x* ∈ {M_υ - 1 - f, ..., N_3 - 1 - f}
    in Table 18 such that
    i_{1,6,l} - s_{f-1} ≥ C(x*, M_υ - f)
  e_f = C(x*, M_υ - f)
  s_f = s_{f-1} + e_f
  if N_3 ≤ 19
    n_{3,l}^{(f)} = N_3 - 1 - x*
  else
    n_l^{(f)} = 2M_υ - 1 - x*
    if n_l^{(f)} ≤ M_{initial} + 2M_υ - 1
      n_{3,l}^{(f)} = n_l^{(f)}
    else
      n_{3,l}^{(f)} = n_l^{(f)} + (N_3 - 2M_υ)
  end if
```

Table 18 shows combinatorial coefficients C(x,y).

TABLE 18

| | | | | | y | | | | |
|---|---|---|---|---|---|---|---|---|---|
| x | 1 | 2 | 3 | 4 | 5 | 6 | 7 | 8 | 9 |
| 0 | 0 | 0 | 0 | 0 | 0 | 0 | 0 | 0 | 0 |
| 1 | 1 | 0 | 0 | 0 | 0 | 0 | 0 | 0 | 0 |
| 2 | 2 | 1 | 0 | 0 | 0 | 0 | 0 | 0 | 0 |
| 3 | 3 | 3 | 1 | 0 | 0 | 0 | 0 | 0 | 0 |
| 4 | 4 | 6 | 4 | 1 | 0 | 0 | 0 | 0 | 0 |
| 5 | 5 | 10 | 10 | 5 | 1 | 0 | 0 | 0 | 0 |
| 6 | 6 | 15 | 20 | 15 | 6 | 1 | 0 | 0 | 0 |
| 7 | 7 | 21 | 35 | 35 | 21 | 7 | 1 | 0 | 0 |
| 8 | 8 | 28 | 56 | 70 | 56 | 28 | 8 | 1 | 0 |
| 9 | 9 | 36 | 84 | 126 | 126 | 84 | 36 | 9 | 1 |
| 10 | 10 | 45 | 120 | 210 | 252 | 210 | 120 | 45 | 10 |
| 11 | 11 | 55 | 165 | 330 | 462 | 462 | 330 | 165 | 55 |
| 12 | 12 | 66 | 220 | 495 | 792 | 924 | 792 | 495 | 220 |
| 13 | 13 | 78 | 286 | 715 | 1287 | 1716 | 1716 | 1287 | 715 |
| 14 | 14 | 91 | 364 | 1001 | 2002 | 4004 | 3432 | 3003 | 2002 |
| 15 | 15 | 105 | 455 | 1365 | 3003 | 5005 | 6435 | 6435 | 5005 |
| 16 | 16 | 120 | 560 | 1820 | 4368 | 8008 | 11440 | 12870 | 11440 |
| 17 | 17 | 136 | 680 | 2380 | 6188 | 12376 | 19448 | 24310 | 24310 |
| 18 | 18 | 153 | 816 | 3060 | 8568 | 18564 | 31824 | 43758 | 48620 |

When $n_{3,l}$ and $M_{initial}$ are known, $i_{1,5}$ and $i_{1,6,l}$ (l=1, ..., $\upsilon$) are found as follows:

If $N_3 \leq 19$, $i_{1,5}=0$ and is not reported. If $M_\upsilon=1$, $i_{1,6,l}=0$, for l=1, ..., $\upsilon$, and is not reported. If $M_\upsilon>1$, $i_{1,6,l}=\Sigma_{f=1}^{M_\upsilon-1} C(N_3-1-n_{3,l}^{(f)}, M_\upsilon-f)$ where C(x, y) is given in Table 18 and where the indices f=1, ..., $M_\upsilon-1$ are assigned such that $n_{3,l}^{(f)}$ increases as f increases.

If $N_3 > 19$, $M_{initial}$ is indicated by $i_{1,5}$, which is reported and given by $$i_{1,5} = \begin{cases} M_{initial} & M_{initial} = 0 \\ M_{initial} + 2M_\upsilon & M_{initial} < 0 \end{cases}$$

Only the nonzero indices $n_{3,l}^{(f)} \in IntS$, where $IntS=\{(M_{initial}+i) \bmod N_3, i=0, 1, ..., 2M_\upsilon-1\}$, are reported, where the indices f=1, ..., $M_\upsilon-1$ are assigned such that $n_{3,l}^{(f)}$ increases as f increases.

The codebooks for 1-4 layers are given in Table 19, where $m_1^{(i)}$, $m_2^{(i)}$, for i=0, 1, ..., L-1, $v_{m_1^{(i)},m_2^{(i)}}$ are obtained as in clause 5.2.2.2.3, and the quantities $\varphi_{l,i,f}$ and $y_{t,l}$ are given by following.

$$\varphi_{l,i,f} = e^{j\frac{2\pi c_{l,i,f}}{16}}$$

$$y_{t,l} = \begin{bmatrix} y_{t,l}^{(0)} & y_{t,l}^{(1)} & \ldots & y_{t,l}^{(M_\upsilon-1)} \end{bmatrix}$$

where t={0, 1, ..., $N_3-1$}, is the index associated with the precoding matrix, l={1, ..., $\upsilon$}, and with $$y_{t,l}^{(f)} = e^{j\frac{2\pi t n_{3,l}^{(f)}}{N_3}}$$

for f=0, 1, ..., $M_\upsilon-1$.

Table 19 shows codebooks for 1-layer, 2-layer, 3-layer and 4-layer CSI reporting using antenna ports 3000~2999+$P_{CSI-RS}$.

TABLE 19

| Layers | |
|---|---|
| $\upsilon = 1$ | $W^{(1)}_{q_1,q_2,n_1,n_2,n_{3,1},p_1^{(1)},\,p_1^{(2)},i_{2,5,1},t} = W^1_{q_1,q_2,n_1,n_2,n_{3,1},p_1^{(1)},\,p_1^{(2)},i_{2,5,1},t}$ |
| $\upsilon = 2$ | $W^{(2)}_{q_1,q_2,n_1,n_2,n_{3,1},p_1^{(1)},p_1^{(2)},i_{2,5,1},n_{3,2},p_2^{(1)},p_2^{(2)},i_{2,5,2},t} = \frac{1}{\sqrt{2}}\left[W^1_{q_1,q_2,n_1,n_2,n_{3,1},p_1^{(1)},p_1^{(2)},i_{2,5,1},t} \quad W^2_{q_1,q_2,n_1,n_2,n_{3,2},p_2^{(1)},p_2^{(2)},i_{2,5,2},t}\right]$ |
| $\upsilon = 3$ | $W^{(3)}_{q_1,q_2,n_1,n_2,n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},t} = \frac{1}{\sqrt{3}}\begin{bmatrix} W^1_{q_1,q_2,n_1,n_2,n_{3,1},p_1^{(1)},p_1^{(2)},i_{2,5,1},t} & W^2_{q_1,q_2,n_1,n_2,n_{3,2},p_2^{(1)},p_2^{(2)},i_{2,5,2},t} \\ W^3_{q_1,q_2,n_1,n_2,n_{3,3},p_3^{(1)},p_3^{(2)},i_{2,5,3},t} & \end{bmatrix}$ |
| $\upsilon = 4$ | $W^{(4)}_{q_1,q_2,n_1,n_2,n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},n_{3,4},p_4^{(1)},p_4^{(2)},i_{2,5,4},t} = \frac{1}{2}\begin{bmatrix} W^1_{q_1,q_2,n_1,n_2,n_{3,1},p_1^{(1)},p_1^{(2)},i_{2,5,1},t} & W^2_{q_1,q_2,n_1,n_2,n_{3,2},p_2^{(1)},p_2^{(2)},i_{2,5,2},t} \\ W^3_{q_1,q_2,n_1,n_2,n_{3,3},p_3^{(1)},p_3^{(2)},i_{2,5,3},t} & W^4_{q_1,q_2,n_1,n_2,n_{3,4},p_4^{(1)},p_4^{(2)},i_{2,5,4},t} \end{bmatrix}$ |

Where $W^l_{q_1,q_2,n_1,n_2,n_3,p_l^{(1)},p_l^{(2)},i_{2,5,l},t} = \frac{1}{\sqrt{N_1 N_2 \gamma_{t,l}}} \begin{bmatrix} \sum_{i=0}^{L-1} v^{(i)}_{m_1^{(i)},m_2^{(i)}} p^{(1)}_{l,0} \sum_{f=0}^{M_\upsilon-1} y^{(f)}_{t,l} p^{(2)}_{l,i,f} \varphi_{l,i,f} \\ \sum_{i=0}^{L-1} v^{(i)}_{m_1^{(i)},m_2^{(i)}} p^{(1)}_{l,1} \sum_{f=0}^{M_\upsilon-1} y^{(f)}_{t,l} p^{(2)}_{l,i+L,f} \varphi_{l,i+L,f} \end{bmatrix}$, $l = 1, 2, 3, 4$, $$\gamma_{t,l} = \sum_{i=0}^{2L-1} \left(p^{(1)}_{l,\lfloor \frac{i}{L} \rfloor}\right)^2 \left|\sum_{f=0}^{M_\upsilon-1} y^{(f)}_{t,l} p^{(2)}_{l,i,f} \varphi_{l,i,f}\right|^2$$

and the mappings from $i_1$ to $q_1, q_2, n_1, n_2, n_{3,1}, n_{3,2}, n_{3,3}, n_{3,4}, p_1^{(1)}, p_2^{(1)}, p_3^{(1)}$ and $p_4^{(1)}$, and from $i_2$ to $i_{2,5,1}, i_{2,5,2}, i_{2,5,3}, i_{2,5,4}, p_1^{(2)}, p_2^{(2)}, p_3^{(2)}$ and $p_4^{(2)}$ are as described above, including the ranges of the constituent indices of $i_1$ and $i_2$.

For coefficients with $k_{l,i,f}^{(3)}=0$, amplitude and phase are set to zero, i.e., $p_{l,i,f}^{(2)}=0$ and $\varphi_{l,i,f}=0$.

The bitmap parameter typeII-RI-Restriction-r16 forms the bit sequence $r_3, r_2, r_1, r_0$ where $r_0$ is the LSB and $r_3$ is the MSB. When $r_i$ is zero, $i \in \{0, 1, \ldots, 3\}$, PMI and RI reporting are not allowed to correspond to any precoder associated with $\upsilon=i+1$ layers.

The bitmap parameter n1-n2-codebookSubsetRestriction-r16 forms the bit sequence $B=B_1 B_2$ and configures the vector group indices $g^{(k)}$ as in clause 5.2.2.2.3.

Bits $b_2^{(k,2(N_1 x_2+x_1)+1)} b_2^{(k,2(N_1 x_2+x_1))}$ indicate the maximum allowed average amplitude, $\gamma_{i+pL}$ (p=0,1), with $i \in \{0, 1, \ldots, L-1\}$, of the coefficients associated with the vector in group $g^{(k)}$ indexed by $x_1, x_2$, where the maximum amplitudes are given in Table 5.2.2.2.5-6 and the average coefficient amplitude is restricted as follows.

$$\sqrt{\frac{1}{\sum_{f=0}^{M_\upsilon-1} k_{l,i+pL,f}^{(3)}} \sum_{f=0}^{M_\upsilon-1} k_{l,i+pL,f}^{(3)} \left(p_{l,p}^{(1)} p_{l,i+pL,f}^{(2)}\right)^2} \le \gamma_{i+pL}$$

for $l=1, \ldots, \upsilon$, and $p=0,1$.

A UE that does not report the parameter softAmpRestriction-r16='supported' in its capability signaling is not expected to be configured with $b_2^{(k,2(N_1 x_2+x_1)+1)} b_2^{(k,2(N_1 x_2+x_1))}=01$ or 10.

Table 20 below shows maximum allowed average coefficient amplitudes for restricted vectors.

TABLE 20

| Bit $b_2^{(k,2(N_1 x_2+x_1)+1)} b_2^{(k,2(N_1 x_2+x_1))}$ | Maximum Average Coefficient Amplitude $\gamma_{i+pL}$ |
|---|---|
| 00 | 0 |
| 01 | $\sqrt{1/4}$ |

TABLE 20-continued

| Bit $b_2^{(k,2(N_1 x_2+x_1)+1)} b_2^{(k,2(N_1 x_2+x_1))}$ | Maximum Average Coefficient Amplitude $\gamma_{i+pL}$ |
|---|---|
| 10 | $\sqrt{1/2}$ |
| 11 | 1 |

Enhanced Type II Port Selection Codebook

For 4 antenna ports {3000, 3001, ..., 3003}, 8 antenna ports {3000, 3001, ..., 3007}, 12 antenna ports {3000, 3001, ..., 3011}, 16 antenna ports {3000, 3001, ..., 3015}, 24 antenna ports {3000, 3001, ..., 3023}, and 32 antenna ports {3000, 3001, ..., 3031}, and the UE configured with higher layer parameter codebookType set to 'typeII-PortSelection-r16'

The number of CSI-RS ports may be configured as described in Type II Port Selection Codebook.

The value of d is configured with the higher layer parameter portSelectionSamplingSize-r16, where $d \in \{1,2,3,4\}$ and $d \le L$.

Values L, β and $p_\upsilon$ are configured as described in Enhanced Type II Codebook, and supported configurations are given in Table 21.

Table 21 shows codebook parameter configurations for L, β, and $p_\upsilon$.

TABLE 21

| paramCombination-r16 | L | $p_\upsilon$ | | β |
|---|---|---|---|---|
| | | $\upsilon \in \{1, 2\}$ | $\upsilon \in \{3, 4\}$ | |
| 1 | 2 | ¼ | ⅛ | ¼ |
| 2 | 2 | ¼ | ⅛ | ½ |
| 3 | 4 | ¼ | ⅛ | ¼ |

TABLE 21-continued

| paramCombination-r16 | L | $p_v$ | | β |
|---|---|---|---|---|
| | | $v \in \{1, 2\}$ | $v \in \{3, 4\}$ | |
| 4 | 4 | 1/4 | 1/8 | 1/2 |
| 5 | 4 | 1/4 | 1/4 | 3/4 |
| 6 | 4 | 1/2 | 1/4 | 1/2 |

The UE shall report the RI value v according to the configured higher layer parameter typeII-PortSelectionRI-Restriction-r16. The UE shall not report υ>4.

The value of R is set as described in the Enhanced Type II Codebook.

The UE is also configured with the higher layer bitmap parameter typeII-PortSelectionRI-Restriction-r16, which forms the bit sequence $r_3, r_2, r_1, r_0$, where $r_0$ is the LSB and $r_3$ is the MSB. When $r_i$ is zero, $i \in \{0, 1, \ldots, 3\}$, PMI and RI reporting are not allowed to correspond to any precoder associated with υ=i+1 layers.

The PMI value corresponds to the codebook indices $i_1$ and $i_2$, and satisfies the following equation.

$$i_1 = \begin{cases} [i_{1,1} i_{1,5} i_{1,6,1} i_{1,7,1} i_{1,8,1}] v = 1 \\ [i_{1,1} i_{1,5} i_{1,6,1} i_{1,7,1} i_{1,8,1} i_{1,6,2} i_{1,7,2} i_{1,8,2}] v = 2 \\ [i_{1,1} i_{1,5} i_{1,6,1} i_{1,7,1} i_{1,8,1} i_{1,6,2} i_{1,7,2} i_{1,8,2} i_{1,6,3} i_{1,7,3} i_{1,8,3}] v = 3 \\ [i_{1,1} i_{1,5} i_{1,6,1} i_{1,7,1} i_{1,8,1} i_{1,6,2} i_{1,7,2} i_{1,8,2} i_{1,6,3} i_{1,7,3} i_{1,8,3} i_{1,6,4} i_{1,7,4} i_{1,8,4}] v = 4 \end{cases}$$

$$i_2 = \begin{cases} [i_{2,3,1} i_{2,4,1} i_{2,5,1}] v = 1 \\ [i_{2,3,1} i_{2,4,1} i_{2,5,1} i_{2,3,2} i_{2,4,2} i_{2,5,2}] v = 2 \\ [i_{2,3,1} i_{2,4,1} i_{2,5,1} i_{2,3,2} i_{2,4,2} i_{2,5,2} i_{2,3,3} i_{2,4,3} i_{2,5,3}] v = 3 \\ [i_{2,3,1} i_{2,4,1} i_{2,5,1} i_{2,3,2} i_{2,4,2} i_{2,5,2} i_{2,3,3} i_{2,4,3} i_{2,5,3} i_{2,3,4} i_{2,4,4} i_{2,5,4}] v = 4 \end{cases}$$

As described in Type II Port Selection Codebook, 2L antenna ports are selected by the index $i_{1,1}$.

Parameters $N_3$, $M_υ$, $M_{initial}$ (for $N_3 > 19$) and $K_0$ are defined in Enhanced Type II Codebook.

For layer l, l=1, ..., υ, the strongest coefficient $i_{1,8,l}$, the amplitude coefficient indicators $i_{2,3,l}$ and $i_{2,4,l}$, the phase coefficient indicator $i_{2,5,l}$ and the bitmap indicator $i_{1,7,l}$ are defined and indicated as described in Type II Port Selection Codebook, where the mapping from $k_{l,p}^{(1)}$ to the amplitude coefficient $p_{l,p}^{(1)}$ is given in Table 16 and the mapping from $k_{l,i,f}^{(2)}$ to the amplitude coefficient $p_{l,i,f}^{(2)}$ is given in Table 17.

The number of nonzero coefficients for layer l, $K_l^{NZ}$, and the total number of nonzero coefficients $K^{NZ}$ are defined as described in Type II Port Selection Codebook.

The amplitude coefficients $p_l^{(1)}$ and $p_l^{(2)}$ (l=1, ..., υ) are represented as described in Type II Port Selection Codebook.

The amplitude and phase coefficient indicators are reported as described in Type II Port Selection Codebook.

Codebook indicators $i_{1,5}$ and $i_{1,6,l}$ (l=1, ..., υ) are found as described in Type II Port Selection Codebook.

The codebooks for 1-4 layers are given in Table 22, where $v_m$ s is a $P_{CSI-RS}/2$-element column vector containing a value of 1 in element (m mod $P_{CSI-RS}/2$) and zeros elsewhere (where the first element is element 0), and the quantities $\varphi_{l,i,f}$ and $y_{t,l}$ are defined as described in Type II Port Selection Codebook.

Table 22 shows a codebook for reporting 1-layer, 2-layer, 3-layer, and 4-layer CSI using antenna ports 3000~2999+$P_{CSI-RS}$.

TABLE 22

| | Layers |
|---|---|
| υ = 1 | $W^{(1)}_{i_{1,1},n_{3,1},p_1^{(1)},p_1^{(2)},i_{2,5,1},t} = W^1_{i_{1,1},n_{3,1},p_1^{(1)},p_1^{(2)},i_{2,5,1},t}$ |
| υ = 2 | $W^{(2)}_{i_{1,1},n_{3,1},p_1^{(1)},p_1^{(2)},i_{2,5,1},n_{3,2},p_2^{(1)},p_2^{(2)},i_{2,5,2},t} = \frac{1}{\sqrt{2}}\left[W^1_{i_{1,1},n_{3,1},p_1^{(1)},p_1^{(2)},i_{2,5,1},t} \quad W^2_{i_{1,1},n_{3,2},p_2^{(1)},p_2^{(2)},i_{2,5,2},t}\right]$ |
| υ = 3 | $W^{(3)}_{i_{1,1},n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},t} = \frac{1}{\sqrt{3}}\left[W^1_{i_{1,1},n_{3,1},p_1^{(1)},p_1^{(2)},i_{2,5,1},t} \quad W^2_{i_{1,1},n_{3,2},p_2^{(1)},p_2^{(2)},i_{2,5,2},t} \quad W^3_{i_{1,1},n_{3,3},p_3^{(1)},p_3^{(2)},i_{2,5,3},t}\right]$ |
| υ = 4 | $W^{(4)}_{i_{1,1},n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},n_{3,4},p_4^{(1)},p_4^{(2)},i_{2,5,4},t} = \frac{1}{2}\begin{bmatrix} W^1_{i_{1,1},n_{3,1},p_1^{(1)},p_1^{(2)},i_{2,5,1},t} & W^2_{i_{1,1},n_{3,2},p_2^{(1)},p_2^{(2)},i_{2,5,2},t} \\ W^3_{i_{1,1},n_{3,3},p_3^{(1)},p_3^{(2)},i_{2,5,3},t} & W^4_{i_{1,1},n_{3,4},p_4^{(1)},p_4^{(2)},i_{2,5,4},t} \end{bmatrix}$ |
| Where $W^l_{i_{1,1},n_{3,1},p_l^{(1)},p_l^{(2)},i_{2,5,l},t}$ | $= \frac{1}{\sqrt{N_1 N_2 \gamma_{t,l}}} \begin{bmatrix} \sum_{i=0}^{L-1} v_{1,1,d+i} p_{l,0}^{(1)} \sum_{f=0}^{M_U-1} y_{t,l}^{(f)} p_{l,i,f}^{(2)} \varphi_{l,i,f} \\ \sum_{i=0}^{L-1} v_{1,1,d+i} p_{l,1}^{(1)} \sum_{f=0}^{M_U-1} y_{t,l}^{(f)} p_{l,i+L,f}^{(2)} \varphi_{l,i+L,f} \end{bmatrix}, l = 1, 2, 3, 4,$ |
| | $\gamma_{t,l} = \sum_{i=0}^{2L-1}\left(p_{l,\lfloor \frac{i}{L} \rfloor}^{(1)}\right)^2 \left|\sum_{f=0}^{M_U-1} y_{t,l}^{(f)} p_{l,i,f}^{(2)} \varphi_{l,i,f}\right|^2$ | and the mappings from $i_1$ to $i_{1,1}, n_{3,1}, n_{3,2}, n_{3,3}, n_{3,4}, p_1^{(1)}, p_2^{(1)}, p_3^{(1)}$ and $p_4^{(1)}$, and from $i_2$ to $i_{2,5,1}, i_{2,5,2}, i_{2,5,3}, i_{2,5,4}, p_1^{(2)}, p_2^{(2)}, p_3^{(2)}$ and $p_4^{(2)}$ are as described above, including the ranges of the constituent indices of $i_1$ and $i_2$.

For coefficients with $k_{l,i,f}^{(3)}=0$, amplitude and phase are set to zero, i.e., $p_{l,i,f}^{(2)}=0$ and $\varphi_{l,i,f}=0$.

The above-described contents may be applied in combination with the methods proposed in the present disclosure to be described later, or supplemented to clarify the technical features of the methods proposed by the present disclosure. The methods described below are only distinguished for convenience of description, and it goes without saying that some components of one method may be substituted with some components of another method, or may be applied in combination with each other.

A process of transmitting and receiving channel state information (CSI) between the BS and the UE is required in order to adaptively configure an optimal number of ranks (the number of transmission layers)/precoding matrix/MCS according to a channel between the BS and the UE when the BS transmits data to the UE. To this end, the BS may transmit a reference signal (RS) for CSI acquisition to the UE, and the UE may receive the RS, and estimate the CSI based on the received RS and report the corresponding CSI to the BS. The BS may configure an appropriate number of ranks/precoding matrix/MCS, etc. when scheduling data to the UE based on the CSI reported from the UE.

When the base station may utilize the reciprocity of the DL/UL channel in the process of acquiring the CSI of the UE, the following effects are derived. The overhead of the RS to be transmitted by the BS to the UE and the overhead for the UE to report the CSI to the BS may be reduced, and system performance may be enhanced based on more accurate CSI.

Assuming DL/UL duplexing of a frequency domain duplexing (FDD) scheme, as described in TR 38.901 document describing channel models from 0.5 GHz to 100 GHz (Chapter 7.6.5), the following effects are derived. It is possible to assume angle and delay reciprocity for DL/UL channels, and by utilizing this, overhead generated in the CSI acquisition process may be reduced and more accurate CSI may be obtained, thereby enhancing the system performance.

In the present disclosure, a method for the BS to acquire the CSI of the UE by utilizing the angle & delay reciprocity for DL/UL channels is proposed. In the present disclosure, '/' may mean including all contents separated by/(and) or including only some of the contents distinguished by/(or).

Prior to describing the details of the proposed technology, the above-described Rel 15/16 Type II codebook will be briefly described.

Rel-15 Type II Codebook

According to this scheme, among the oversampled DFT vectors, L basis DFT vectors are used per specific pole (polarization). Specifically, this scheme applies a wideband (WB) amplitude coefficient and a subband (SB) amplitude/phase coefficient to the corresponding basis DFT vectors to constitute the precoding matrix.

Among the oversampled DFT vectors, a specific vector is represented by $v_{l,m}$ and may be defined as follows.

$$u_m = \left\{ \begin{bmatrix} 1 & e^{j\frac{2\pi m}{O_2 N_2}} & \ldots & e^{j\frac{2\pi m(N_2-1)}{O_2 N_2}} \end{bmatrix} N_2 > 1 \\ 1 N_2 = 1 \right.$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

Since each parameter in the above formula is defined in the Rel 15/16 Type II codebook, redundant descriptions are omitted.

Rel-15 Type II Port Selection Codebook

According to this scheme, the precoding matrix is constructed by replacing L basis DFT vectors per specific pole with beamformed CSI-RS ports in the Rel-15 Type II codebook.

Rel-16 Type II Codebook

Method of compressing and reporting codebook information using frequency domain correlation for Rel-15 Type II codebook. At this time, in order to compress the codebook information, compressed information may be configured based on a set of some vectors of the oversampled DFT codebook. A set of some vectors of the above oversampled DFT codebook may be named frequency domain (FD) basis vectors. Among $M_v$ FD basis vectors, a t (where t=0, ..., $N_3$−1)-th element of an f-th vector is represented by $y_{t,l}^{(f)}$, and defined as follows.

$$y_{t,l}^{(f)} = e^{j\frac{2\pi t n_{3,l}^{(f)}}{N_3}}$$

In the above equation, $M_v$ FD basis vector combinations selected in an oversampled DFT codebook having a size of $N_3$ through a $n_{3,l}^{(f)}$ where f=0, ..., $M_v$−1 value may be reported to the BS. Since each parameter in the above equation is defined in the Rel 15/16 Type II codebook, redundant descriptions are omitted.

Rel-16 Type II Port Selection Codebook

According to this scheme, the precoding matrix is constructed by replacing L basis DFT vectors per specific pole with beamformed CSI-RS ports in the Rel-16 Type II codebook.

(Proposal 1)

Hereinafter, methods for increasing the degree of freedom of the UE for port selection will be described.

In the case of an FDD system that may assume DL/UL channel reciprocity, (beamformed) CSI-RS ports adopting precoding in the spatial domain and precoding in the frequency domain may be transmitted to the UE by using angle/delay characteristics estimated based on a UL signal/channel at the BS. In this case, a larger number of ports may be required compared to existing CSI-RS ports, which assume only precoding application in the spatial domain. In the case of the existing scheme, there is a disadvantage in that since the UE may select only L consecutive port(s) of P/2 CSI-RS port(s), the degree of freedom of the UE for CSI-RS port selection is low.

Therefore, in order to support the enhanced Type II port selection codebook and CSI feedback, a method that may support a larger number of CSI-RS port(s) and allow the UE to select/report non-contiguous port combinations needs to be introduced.

In order to support the above improved method, an operation according to the conventional scheme will be described below.

In order to select the spatial domain (SD) basis vector and the frequency domain (FD) basis vector preferred by the UE, the UE may report three report values (i.e., $i_{1,1}$, $i_{1,5}$, $i_{1,6,l}$) to the BS. In order to select a basis vector combination having an actual report value within the selected SD/FD basis vector combination, the UE may report one report value (i.e., $i_{1,7,l}$) to the BS. The role and meaning of $i_{1,1}$, $i_{1,5}$, $i_{1,6,l}$, $i_{1,7,l}$ are as follows.

$i_{1,1}$: A value within a range of $$\left\{0, 1, \ldots, \left\lceil \frac{P_{CSI-RS}}{2d} \right\rceil - 1\right\}$$

may be provided. For $P_{CSI-RS}$ CSI-RS port(s) transmitted to the UE, each polarization corresponds to $P_{CSI-RS}/2$ port(s). $i_{1,1}$ may be used to select L port(s) among $P_{CSI-RS}/2$ port(s) corresponding to the same polarization. At this time, among $P_{CSI-RS}/2$ CSI-RS port(s), L port(s) consecutive from the $i_{1,1}$-th CSI-RS port reported by the UE may be selected. This may be equally applied to $P_{CSI-RS}/2$ ports corresponding to different polarizations. d may be configured in the UE as one value of {1, 2, 3, 4} through RRC signaling (portSelectionSamplingSize-r16) of the BS.

$i_{1,5}$, $i_{1,6,l}$: may be used for selecting the FD basis vector. Based on $i_{1,6,l}$, it is possible to select Mv specific FD basis vector(s) among a total of N3 FD basis vector(s). However, when N3 is greater than a specific value (19), a specific value within the range of {0, 1, ..., 2Mv-1} is selected based on $i_{1,5}$, and among 2Mv specific FD basis vector(s), Mv specific FD basis vector(s) may be selected based on $i_{1,6,l}$ from the value selected by the $i_{1,5}$. $i_{1,6,l}$ may be reported as a different value for each layer.

$i_{1,7,l}$: may be used to select a basis vector combination having an actual report value within the SD basis vector and FD basis vector combinations selected through the $i_{1,1}$, $i_{1,5}$, $i_{1,6,l}$.

The following operations may be considered in relation to three report values $i_{1,1}$, $i_{1,5}$, $i_{1,6,l}$ among the four report values of the UE described above. Based on the angle/delay characteristics estimated by the BS based on the UL signal/channel, the BS may configure the three report values $i_{1,1}$, $i_{1,5}$, $i_{1,6,l}$ to appropriate values in the UE. Alternatively, when the BS and the UE are defined to operate based on predefined rules, the UE may be configured not to report a separate value to the BS or to reduce feedback overhead for reporting.

The following operation may be considered in relation to $i_{1,7,l}$ among the four report values of the UE described above. The UE may calculate preferred coefficients based on SD-FD paired CSI-RS ports transmitted with precoding applied in the spatial and frequency domains, and report, to the BS, specific SD-FD paired CSI-RS ports having a significant coefficient among all SD-FD paired CSI-RS ports transmitted to the UE based on a value of $i_{1,7,l}$.

An example of the process is as follows. It is assumed that P CSI-RS ports are transmitted to the UE and L (numberOfBeams)=P/2 is configured. The UE may not separately report a value for CSI-RS port selection to the BS. This is because all CSI-RS ports transmitted to the UE may be used as (SD) basis vectors. According to the prior art, a P value may be configured to {4,8,12,16,24,32} and an L value may be configured to {2,4,6}. However, this is only an example, and it may be assumed that a P value of 32 or more and an L value of 6 or more are configured for embodiments to be described later. For example, cases of L=20 and P=40 may be assumed.

And, Mv, which means the number of FD basis vectors (which may be reported by the UE) of the (v+1)-th layer, is configured to m, and the FD basis vectors (i.e., delay values) corresponding to the m may be assumed as a specific vector (or value) by the UE based on a BS configuration or a fixed rule between the BS and the UE (e.g., delays $\tau_0$, $\tau_1$, ..., $\tau_{m-1}$). In this case, the UE may not separately report information on the preferred FD basis vector combination.

In other words, the $i_{1,1}/i_{1,5}/i_{1,6,l}$ may not be reported in the case of a specific P/L value and/or a specific Mv value. In addition, the UE may report K SD-FD paired CSI-RS port(s) having actual report values among a total of 2Lm SD-FD paired CSI-RS port(s) to the BS using $i_{1,7,l}$. As a result, the UE may not perform a separate report on $i_{1,1}$, $i_{1,5}$, $i_{1,6,l}$, and based on all CSI-RS port(s) transmitted to the UE, report port information having an actual significant report value to the BS through $i_{1,7,l}$.

Therefore, according to the conventional scheme, the UE selects only L consecutive port(s) (selects 2L port(s) for two polarizations), and should select a port having a significant report value within L selected port(s). However, according to the above-described method, the UE may freely select and report ports having report values within all CSI-RS port(s) transmitted to the UE.

Therefore, a method of using $i_{1,7,l}$ may be considered in order to increase the degree of freedom of the UE for port selection. Compared to the conventional scheme, the $i_{1,7,l}$ needs to be improved as follows.

According to the conventional scheme, $i_{1,7,l}$ is defined based on a bitmap format, so assuming the above-described example, 2LMv bits are required for $i_{1,7,l}$. In this case, as the number of CSI-RS ports increases, a problem in which the number of bits required for this increases excessively may occur. For the above reasons, methods of mitigating the increase in the number of bits of $i_{1,7,l}$ for free port selection will be described below.

[Proposal A1]

When the total number of candidates that may have a report value is X and the total number of coefficients with an actual report value among the X candidates is K, a method of defining the number of bits of $i_{1,7,l}$ based on at least one of the following 1) or 2) may be considered.

1) Number of bits to report K values in the range [1:X] (i.e., K=1, 2, ..., X) (e.g., ceiling(log 2(X)) bits)
2) Number of bits to select K out of X (e.g., ceiling(log 2(combination(X, K))) bits)

In the above proposal, 'the total number of candidates that may have a report value' may correspond to X=P*M (M>=1) when the (SD-FD paired) CSI-RS port transmitted to the UE is P. In other words, 'the total number of candidates that may have a report value' may mean the number of bits of a bitmap reported as $i_{1,7,l}$ of the current standard. In this case, P and/or M may be configured to the UE based on L1/L2 signaling by the BS, or may be defined as a fixed rule between the BS and the UE.

More specifically, M may mean the number of coefficients that may be reported for each (SD-FD paired) CSI-RS port, configured to the UE based on L1/L2 signaling by the BS, or defined as a fixed rule between the BS and the UE. This may be equally applied to Proposal A2 described later.

FIG. 8 illustrates the number of bits related to CSI reporting according to an embodiment of the present disclosure.

Referring to FIG. 8, X is 32, 8a means a K value, and 8b indicates the number of bits corresponding to X and K. For example, the number of bits according to 8b may be expressed as ceiling(log 2(X))+ceiling(log 2(combination (X, K))).

In the case of the conventional method, a fixed number of bits is required according to the value of X (i.e., X=32, 32 bits). On the other hand, in the example of FIG. 8, although there is a change according to the K value, it can be confirmed that a smaller number of bits is required compared to the conventional method.

However, when the K value corresponds to a specific value (e.g., 12 to 20), a larger number of bits than the conventional method may be required. In order to prevent this case, the following operation may be considered.

The BS may configure the K value to the UE based on L1/L2 signaling, or the corresponding K value may be defined as a fixed rule between the BS and the UE.

Alternatively, the BS may configure a specific candidate group for the K value to the UE based on L1/L2 signaling so that the UE may report the K value within a limited number of bits, or a specific candidate group for the corresponding K value may be defined as a fixed value between the BS and the UE.

FIGS. 9 and 10 illustrate the number of bits related to CSI reporting according to another embodiment of the present disclosure. Specifically, FIGS. 9 and 10 show examples of cases in which an additional proposal for the K value is applied.

Referring to FIGS. 9 and 10, X is 32, first rows 9a and 10a indicate K values, and second rows 9b and 10b indicate the number of bits corresponding to X and K.

FIG. 9 illustrates a case in which the K value is i) configured by the BS to the UE (based on L1/L2 signaling) or ii) defined as a fixed rule between the BS and the UE.

FIG. 10 illustrates a case in which a specific candidate group for the K value is i) configured by the BS to the UE (based on L1/L2 signaling) or ii) defined as a fixed rule between the BS and the UE.

In the case of FIG. 9, although the terminal may not report the preferred K value, the number of bits is not required because a separate report on the K value is not required. Therefore, only ceiling(log 2(combination(X, K))) bits for selecting K out of X are required.

In the case of FIG. 10, it is possible to report the K value preferred by the UE, but the K value candidates that may be reported are limited (K={8,12,20,24} in the above example). That is, in the example of FIG. 10, the number of bits for reporting the K value may be reduced to 2 bits. The number of K value candidates in FIG. 10 is only an example and does not limit the technical scope of the present disclosure.

The proposed methods below Proposal A1 may be independently applied, or the bitmap scheme capable of corresponding to X candidates and the different proposed methods may be applied together. For example, the reporting method of the UE may be determined based on the total number K of coefficients having actual report values among X candidates.

When the UE does not perform a separate report on $i_{1,1}$, $i_{1,5}$, $i_{1,6,l}$ and based on all CSI-RS port(s) transmitted to the UE, the UE intends to report the CSI-RS port value/information and/or FD having an actual significant report value, the method may be applied for the purpose of extending the function of $i_{1,7,l}$ of the current standard.

When the UE does not separately report on $i_{1,1}$, $i_{1,5}$, $i_{1,6,l}$, the value/information on $i_{1,1}$, $i_{1,5}$, $i_{1,6,l}$ that the UE should assume may be based on at least one of the following i) or ii).

i) The value/information for $i_{1,1}$, $i_{1,5}$, $i_{1,6,l}$ is configured to an appropriate value in the UE based on the angle/delay characteristic estimated by the BS based on the UL signal/channel
  ii) The value/information for $i_{1,1}$, $i_{1,5}$, $i_{1,6,l}$ is assumed as a specific value based on a predefined rule for $i_{1,1}$, $i_{1,5}$, $i_{1,6,l}$ between the BS and the UE The operation may also be equally applied to Proposal A2 below.

[Proposal A2]

When the total number of candidates that may have a report value is X, and the total number of coefficients with an actual report value among the X candidates is K, when the size of K and/or X is a value that falls within a specific range, a method of defining the number of bits of $i_{1,7,l}$ based on at least one of the following 1), 2) or 3) may be considered.

1) Number of bits to report K values in the range [1:X] (i.e., K=1, 2, ..., X) (e.g., ceiling(log 2(X)) bits)
  2) Number of bits to report any starting point K' in [0:r*K−1] (e.g., ceiling(log 2(r*K)))
  3) The number of bits to select K out of r*K candidates from the K' (e.g., ceiling(log 2(combination(r*K, K))) bits)

In the above proposal, the 'specific range' for determining 'when the size of K and/or X is within a specific range' may be configured by the BS to the UE based on L1/L2 signaling, or defined as a fixed rule between the BS and the UE. For example, in the method of Proposal A1 (FIG. 8), when the K value is 12 to 20, the number of bits increases more than in the conventional method. Therefore, in this case, $i_{1,7,l}$ is reported as in the conventional method, and the proposed method of the present disclosure (e.g., Proposal A1/A2) may be applied within the K value range in which the number of bits may be reduced compared to the conventional method. In the above proposal, r may be configured by the BS to the UE based on L1/L2 signaling or defined as a fixed rule between the BS and the UE. For example, r*K may have a value less than or equal to X.

FIG. 11 illustrates the number of bits related to CSI reporting according to yet another embodiment of the present disclosure. Specifically, FIG. 11 shows an example in which the above-described proposed method is applied.

Referring to FIG. 11, X is 32, 11a means the K value, 11b indicates the number of bits corresponding to X and K, and r is assumed as 2.

In the case of the conventional method, a fixed number of bits is required according to the value of X. In the example of FIG. 11, although there is a change according to the K value, it may be confirmed that a smaller number of bits is required compared to the conventional method.

However, when the K value corresponds to a specific value (e.g., 13 to 16), a larger number of bits than the conventional method may be required. In order to prevent this case, the following operation may be considered.

The BS may configure the K value to the UE based on L1/L2 signaling, or the corresponding K value may be defined as a fixed rule between the BS and the UE.

Alternatively, the BS may configure a specific candidate group for the K value to the UE based on L1/L2 signaling so that the UE may report the K value within a limited number of bits, or a specific candidate group for the corresponding K value may be defined as a fixed value between the BS and the UE.

FIGS. 12 and 13 illustrate the number of bits related to CSI reporting according to yet another embodiment of the present disclosure. Specifically, FIGS. 12 and 13 show examples of cases in which an additional proposal for the K value is applied.

Referring to FIGS. 12 and 13, X is 32, first rows 12a and 13a indicate K values, second rows 12b and 13b indicate the number of bits corresponding to X and K, and r is assumed as 2.

FIG. 12 illustrates a case in which the K value is i) configured by the BS to the UE (based on L1/L2 signaling) or ii) defined as a fixed rule between the BS and the UE.

FIG. 13 illustrates a case in which a specific candidate group for the K value is i) configured by the BS to the UE (based on L1/L2 signaling) or ii) defined as a fixed rule between the BS and the UE (in the above example, K={6, 8,10,12}). That is, in the example of FIG. 13, the number of bits for reporting the K value may be reduced to 2 bits.

The proposed methods below Proposal A2 may be independently applied, or the bitmap scheme capable of corresponding to X candidates and the different proposed methods may be applied together. For example, the reporting method of the UE may be determined based on the total number K of coefficients having actual report values among X candidates.

The proposed methods below A1/A1 may be independently applied, or different methods may be applied together (including the conventional bitmap scheme). For example, the reporting method of the UE may be determined based on the total number K of coefficients having actual report values among X candidates. For example, $i_{1,7,l}$ may be reported as the number of bits determined through the above-described proposed method (e.g., Proposal A1/A2). As another example, a parameter (e.g., $i_{1,7,l}'$) for reporting apart of the total number of candidates that may have a report value may be defined, and the number of bits may be reported in the conventional number or the number of reduced bits reduced in consideration of the payload of the CSI report.

Meanwhile, the following proposed method may be applied to extend/improve the function of $i_{1,1}$ for selecting a specific CSI-RS port.

[Proposal A3]

Among the P CSI-RS port(s) transmitted to the UE, the number of bits for selecting N ports for which the UE may have a report value may be defined based on at least one of the following 1) or 2).

1) ceiling(log 2(P)) bit
2) ceiling(log 2(combination(P, N))) bit

The port selection operation based on $i_{1,1}$ according to the conventional scheme may be performed as follows.

For $P_{CSI-RS}$ CSI-RS ports transmitted to the UE, $P_{CSI-RS}/2$ ports correspond per polarization. $i_{1,1}$ may be used to select L ports among $P_{CSI-RS}/2$ ports corresponding to the same polarization. At this time, among CSI-RS port(s), L port(s) consecutive from the $i_{1,1}$-th CSI-RS port reported by the UE may be selected. This may be equally applied to $P_{CSI-RS}/2$ ports corresponding to different polarizations. Therefore, in the case of the conventional scheme, it is difficult to freely select a port in that only consecutive L port(s) may be selected and only ports in the same order may be selected for different polarizations.

According to the embodiment, the UE may freely select N ports for all P transmitted CSI-RS ports.

For example, information on N (or N/2) ports selected from P (or P/2) ports may be reported as $i_{1,1}$.

And/or, when each polarization corresponds to P/2 port(s) in the Proposal A3, an operation may be assumed in which by assuming that the same port is selected for each different polarization, and among the P port(s), N'(N/2) port(s) are selected from P'(P/2) port(s) rather than selecting N port(s) from P port(s).

For example, the number of bits required for reporting $i_{1,1}$ may be expressed as ceiling(log 2(P')) bits or ceiling(log 2(combination(P', N'))) bits. For example, the number of bits required for reporting $i_{1,1}$ may be expressed as ceiling(log 2(P/2)) bits or ceiling(log 2(combination(P/2, N/2))) bits.

$i_{1,1}$ defined as the number of bits as described above may be equally applied to P/2 port(s) corresponding to different polarizations, and the port may be selected.

And/or, bits for selecting N ports in the proposal A3 may have layer common, layer specific, and/or layer group specific characteristics.

When the characteristics of bits for selecting N ports are the layer common, the same N ports may be selected for all layers.

When the characteristics of bits for selecting N ports are the layer specific, a separate set of bits may be defined for each layer. Based on this, N port(s) may be independently selected for each layer.

When the characteristics of bits for selecting N ports are the layer group specific, a separate set of bits may be defined for each layer group. Based on this, N port(s) may be independently selected for each layer group.

In the case of the layer specific/layer group specific, an appropriate number of port(s) may be selected for each layer or layer group. Therefore, there is an advantage in that feedback overhead corresponding to each port(s) may be reduced thereafter.

In the case of the current Rel-16, the number of combining SD beams may be indicated by configuring a parameter called L. The number of FD bases is configured as a function of a parameter called pv (L, pv, and β may be configured as a specific combination in the UE through a higher layer parameter called paramCombination-r16).

The maximum number of non-zero coefficients reported for a specific layer is indicated as a function of $K_0 = \lceil \beta 2LM_1 \rceil$. This is to prevent unnecessarily increasing the payload due to reporting of non-dominant coefficients. On the Rel-17 codebook framework, since the gNB may predict the number of significant coefficients to some extent by UL/DL reciprocity, it is possible to configure a more accurate codebook size (CB size).

Accordingly, the BS may configure/indicate the maximum number of coefficients that the UE should report for each layer or across layers (across layers). The number of reported coefficients and payload size are determined by this configured value. That is, reporting of non-zero amplitude coefficients across layer or per layer included in Part 1 CSI may be omitted.

The above operations may be supported through higher layer configuration (e.g., by RRC/MAC CE) and/or DCI indication. Specifically, the operations based on the following 1) and 2) may be supported through the higher layer configuration (e.g., by RRC/MAC CE) and/or DCI indication.

1) An operation of the BS which configures/indicates the maximum number of coefficients that the UE should report by layer or across layers (or operation of configuring/indicating parameters required for this, for example, $K_0$, β, L, $M_v$, $p_v$)

2) An operation in which the number of coefficients and the payload size reported by the UE are determined according to the configured value For Enhanced Type II CSI feedback, Part 1 includes an indication of the total number of non-zero amplitude coefficients across layers for RI, CQI, and Enhanced Type II CSI (see Enhanced Type II Codebook above). The fields of Part 1 (RI, CQI, and indication of the total number of non-zero amplitude coefficients across the layers) are separately encoded. Part 2 includes the PMI of Enhanced Type II CSI. Part 1 and Part 2 are encoded separately.

$i_{1,8,l}$ is an indicator indicating which coefficient is the most dominant (strongest) for a specific l-th layer.

$i_{1,8,l}$ is used to indicate the strongest beam among 2L SD beam(s). It is assumed that the FD basis corresponding to the strongest beam corresponds to a specific sequential index (e.g., first index, index=0) among Mv, and $i_{1,8,l}$ is used to indicate the strongest SD/FD beam.

In the case of the port selection codebook considered in current Rel-17, the BS transmits the CSI-RS to the UE through SD/FD-based beamforming. In this case, by assuming that a specific CSI-RS port (e.g., lowest/highest CSI-RS port index) is mapped to the CSI-RS, reporting of $i_{1,8,l}$ by the UE may be omitted. This may reduce the overall codebook payload. Whether to perform the $i_{1,8,l}$ reporting omission operation may be configured in consideration of the UL/DL reciprocity. It may be preferable that the operation in which the report of is omitted is performed in a situation where UL/DL reciprocity is very well matched. The BS may configure, in the UE, whether to omit reporting of a parameter $i_{1,8,l}$).

On the other hand, in order to improve the reporting value of the UE as in the proposed method below Proposal A1/A2/A3, reciprocity between DL/UL channels between the BS and the UE should be assumed. That is, high similarity between DL/UL channels should be assumed. Therefore, when the reciprocity between the DL/UL channels between the BS and the UE may not be assumed, the CSI should be reported based on the conventional Rel-15/16 codebook structure.

To this end, the BS and/or the UE may configure/report reciprocity related information between the DL/UL channels (e.g., DL/UL reciprocity, the degree of the similarity between the DL/UL channels, etc.). In addition, when reporting the CSI, the UE may assume a specific codebook structure based on configuring/reporting information related to the reciprocity between the DL/UL channels. For example, when the BS configures, in the UE, information indicating that the DL/UL reciprocity is established (when the UE reports the information indicating that the DL/UL reciprocity is established to the BS), the UE may report the CSI based on at least one of the above proposals A1/A2/A3.

In addition to the above Proposal A1/A2/A3, the maximum number of delays that may be mapped for each (SD) CSI-RS port and/or (SD) CSI-RS port group may be defined/regulated in advance between the UE and the BS. Alternatively, a plurality of mapping patterns related to delay may be predefined/configured for each (SD) CSI-RS port and/or (SD) CSI-RS port group, and one or more mapping patterns among them may be semi-statically/dynamically configured in the UE. According to the conventional scheme, the maximum number of delays that may be mapped for each (v+1)-th layer may be configured in the UE through a value Mv. When the above proposal is applied, the Mv value may be configured/indicated differently for each CSI-RS port (group) as well as for each layer. The above operation has an advantage in that feedback overhead may be reduced by optimizing a payload that may correspond to each port.

[Proposal 2]

Hereinafter, a method of configuring a PMI subband will be described.

In the Rel-16 Type II codebook, the number of PMI subbands per CQI subband may be configured in the UE through a parameter numberOfPMISubbandsPerCQISubband. The numberOfPMISubbandsPerCQISubband may be configured to 1 or 2. Meanwhile, a method of applying an enhanced operation in relation to the numberOfPMISubbandsPerCQISubband for Type II port selection codebook in an environment capable of operating based on the DL/UL reciprocity may be considered.

[Proposal B1]

A value of less than or equal to 1 may be configured in numberOfPMISubbandsPerCQISubband. When a value equal to or less than 1 is set in numberOfPMISubbandsPerCQISubband, the following operation may be performed.

The BS may configure/indicate, to the UE, which subband of the CQI subband(s) should be used/assumed as the PMI subband. Alternatively, (information on) which subband among the CQI subband(s) should be used/assumed as the PMI subband may be defined/configured based on a fixed rule.

For example, as an enhanced operation related to numberOfPMISubbandsPerCQISubband, a value of less than or equal to 1 may be configured in numberOfPMISubbandsPerCQISubband. When the DL/UL reciprocity is used, the BS may perform precoding based on delay/angle information, and based on this, the UE may measure codebook parameters through a wideband operation. When the UE may perform the wideband operation, the BS may consider reducing the number of PMI subbands. And, for this operation, it may be considered to configure numberOfPMISubbandsPerCQISubband to a value less than or equal to 1. In this case, the number of PMI subbands may be smaller than the number of CQI subbands configured in the UE. Among the CQI subbands, a subband to be assumed by the UE as the PMI subband may be explicitly/implicitly configured/indicated to the UE. Alternatively, based on a preconfigured/fixed rule, the UE may assume a specific subband among the configured CQI subbands as the PMI subband.

An example of the preconfigured/fixed rule will be described in detail below.

When numberOfPMISubbandsPerCQISubband=x (e.g., x<1, x=½, ¼, etc.), even (or odd) CQI subbands may be defined as assumed to be the PMI subband. Alternatively, it may be defined to assume that as many CQI subbands as the corresponding number are sequentially mapped to PMI subbands based on ascending/descending order. For example, as many CQI subbands as the number of PMI subbands from the CQI subband having the lowest index in ascending order may be assumed as the PMI subband. For example, as many CQI subbands as the number of PMI subbands from the CQI subband having the highest index in descending order may be assumed as the PMI subband.

In addition to or in place of the proposed method, a separate parameter for configuring the number of PMI subbands to less than or equal to the number of CQI subbands may be defined. A parameter capable of configuring the number of CQI subbands per PMI subband may be defined. For example, the corresponding parameter may be defined as R'.

When R'=2 is configured, two CQI subbands may correspond to one PMI subband. In the case of applying the above method, compared to adjusting the existing numberOfPMISubbandsPerCQISubband value, there may be an advantage that a more flexible indication may be given.

As another example, even when maintaining the existing value of numberOfPMISubbandsPerCQISubband=1, when R'=2, if the configured SB granularity is 4, the PMI SB will be configured by the unit of 4 and the CQI SB by the unit of 2. Alternatively, the PMI SB may be defined to be configured by the unit of 8 and the CQI SB to be configured by the unit of 4. That is, the configured SB granularity may be configured targeting the PMI SB or the CQI SB.

[Proposal B2]

When Mv=1 and/or N=1 are configured, a value of numberOfPMISubbandsPerCQISubband<1 may be configured/indicated. Alternatively, when the numberOfPMISubbandsPerCQISubband<1 value is configured/indicated, the UE may assume Mv=1 and/or N=1.

As described above, when the DL/UL reciprocity is used, the BS may perform the precoding based on the delay/angle information, and based on this, the UE may measure the codebook parameters through the wideband operation. When the UE may perform the wideband operation, the BS may configure Mv and/or N to 1 to the UE. In this case, a value of numberOfPMISubbandsPerCQISubband<1 (e.g., ½, ¼, etc.) may be defined to be configured/indicated. Or, conversely, when the value of numberOfPMISubbandsPerCQISubband<1 is configured/indicated, it may be defined to assume that the value of Mv and/or N is 1.

Mv may mean the number of FD basis vectors assumed by the UE to form a precoding matrix (based on BS configuration/indication and selection of the UE). N may mean the number of candidate vectors that the UE may assume as the FD basis vectors (based on the BS configuration/indication).

[Hereinafter, Signaling Procedure]

FIG. 14 is a flowchart for describing a signaling procedure to which a method proposed by the present disclosure may be applied.

Specifically, FIG. 14 shows signaling between the BS and the UE to which the methods (e.g., proposal A1/A2/A3 of proposal 1, etc.) proposed by the present disclosure may be applied. Here, the UE/BS is only an example, and may be applied to various devices as described in FIGS. 17 to 21.

FIG. 14 is just for convenience of the description and does not limit the scope of the present disclosure. Also, some step(s) illustrated in FIG. 14 may be omitted depending on a circumstance and/or a configuration. Further, it goes without saying that the order of some step(s) illustrated in FIG. 14 may be changed. In the operation of the BS/UE of FIG. 14, the above-described technical contents (CSI related operation/Rel-15/16 type II codebook, etc.) may be referenced/used.

The BS may mean a generic term for an object that transmits and receives data to and from the UE. For example, the base station may be a concept including one or more transmission points (TPs), one or more transmission and reception points (TRPs), and the like. Further, the TP and/or the TRP may include a panel, a transmission and reception unit, and the like of the BS. In addition, "TRP" may be replaced and applied as an expression such as a panel, an antenna array, a cell (e.g., macro cell/small cell/pico cell, etc.), a TP (transmission point), a base station (base station, gNB, etc.), etc. As described above, the TRPs may be distinguished according to information (e.g., index, ID) on the CORESET group (or CORESET pool). As an example, when one UE is configured to transmit/receive with multiple TRPs (or cells), this may mean that multiple CORESET groups (or CORESET pools) are configured for one UE. The configuration of such a CORESET group (or CORESET pool) may be performed through higher layer signaling (e.g., RRC signaling, etc.).

The UE may receive a configuration from the BS (S1410). That is, the BS may transmit the configuration to the UE. The configuration may include system information (SI) and/or scheduling information and/or CSI related Config. (CSI reporting setting, CSI-RS resource setting, etc.). The configuration may be transmitted through a higher layer (e.g., RRC or MAC CE). In addition, when the setting information is predefined or configured, the corresponding step may be omitted.

For example, as described in the above-mentioned proposed methods (e.g., Proposal A1/Proposal A2/Proposal A3 of Proposal 1, etc.), the configuration may include NZP-CSI-RS-Resourceset IE/NZP-CSI-RS-ResourceID/CSI measurement configuration/CSI report configuration (e.g., CSI-ReportConfig)/CSI resource configuration (e.g., CSI-ResourceConfig). For example, the configuration may include a PDCCH configuration/PDSCH configuration. The configuration may include information on the number (e.g., K) that an actual terminal should report among all candidates that may be reported as CSI. For example, based on the configuration, the maximum number of coefficients that the UE should report may be configured/indicated for each layer or across layers. For example, the reciprocity related information between the DL/UL channels (e.g., whether there is DL/UL reciprocity, the degree of the similarity between the DL/UL channels, etc.) may be configured based on the configuration.

For example, the operation of receiving the configuration from the BS (100/200 in FIG. 18) by the UE (100/200 in FIGS. 17 to 21) in step S1410 described above may be implemented by the devices in FIGS. 17 to 21 to be described below. For example, referring to FIG. 18, one or more processors 102 may control one or more transceivers 106 and/or one or more memories 104 to receive the configuration, and one or more transceivers 106 may receive the configuration.

For example, the operation of transmitting the configuration to the UE (100/200 in FIG. 18) by the BS (100/200 in FIGS. 17 to 21) in step S1410 described above may be implemented by the devices in FIGS. 17 to 21 to be described below. For example, referring to FIG. 18, one or more processors 102 may control one or more transceivers 106 and/or one or more memories 104 to transmit the configuration, and one or more transceivers 106 may transmit the configuration to the UE.

The UE may receive control information from the BS (S1420). That is, the BS may transmit the control information to the UE. For example, the control information may mean DCI and may be received through PDCCH. For example, the control information may include an indication for CSI reporting. As an example, the control information may include information for triggering aperiodic CSI reporting. For example, in the case of semi-persistent CSI reporting/periodic CSI reporting, step S1420 may be omitted. For example, the control information may include information on the number (e.g., K) that an actual terminal should report among all candidates that may be reported as CSI. For example, based on the control information, the maximum number of coefficients that the UE should report may be configured/indicated for each layer or across layers.

For example, the operation of receiving the control information from the BS (100/200 in FIG. 18) by the UE (100/200 in FIGS. 17 to 21) in step S1420 described above may be implemented by the devices in FIGS. 17 to 21 to be described below. For example, referring to FIG. 18, one or more processors 102 may control one or more transceivers 106 and/or one or more memories 104 to receive the control information, and one or more transceivers 106 may receive the control information.

For example, the operation of transmitting the control information to the UE (100/200 in FIG. 18) by the BS (100/200 in FIGS. 17 to 21) in step S1420 described above may be implemented by the devices in FIGS. 17 to 21 to be described below. For example, referring to FIG. 18, one or more processors 102 may control one or more transceivers 106 and/or one or more memories 104 to transmit the control information, and one or more transceivers 106 may transmit the control information to the UE.

The UE may receive an RS (e.g., SSB/CSI-RS/TRS/PT-RS) for channel state measurement from the BS (S1430). That is, the BS may transmit the RS to the UE. For example, the RS may be transmitted periodically/aperiodically/semi-persistently. For example, as described in the above-described proposed methods (e.g., Proposal A1/Proposal A2/Proposal A3 of Proposal 1, etc.), the (beamformed) CSI-RS port to which the precoding in the SD and the precoding in the FD are applied may be transmitted to the UE.

For example, the operation of receiving the RS from the BS (100/200 in FIG. 18) by the UE (100/200 in FIGS. 17 to 21) in step S1430 described above may be implemented by the devices in FIGS. 17 to 21 to be described below. For example, referring to FIG. 18, one or more processors 102 may control one or more transceivers 106 and/or one or more memories 104 to receive the RS, and one or more transceivers 106 may receive the RS.

For example, the operation of transmitting the RS to the UE (100/200 in FIG. 18) by the BS (100/200 in FIGS. 17 to 21) in step S1430 described above may be implemented by the devices in FIGS. 17 to 21 to be described below. For example, referring to FIG. 18, one or more processors 102 may control one or more transceivers 106 and/or one or more memories 104 to transmit the RS, and one or more transceivers 106 may transmit the RS to the UE.

The UE may perform CSI measurement based on the RS and information configured from the BS (e.g., reporting setting information, information indicated by DCI, etc.) (S1440). For example, the UE may perform CSI measurement based on the above-described proposed methods (e.g., Proposal A1/Proposal A2/Proposal A3 of Proposal 1, etc.). For example, CSI measurement may be performed based on a codebook (e.g., Type I, Type II, enhanced Type II, port selection codebook, etc.).

For example, the operation of performing the CSI measurement by the UE (100/200 in FIGS. 17 to 21) in step S1440 described above may be implemented by the devices in FIGS. 17 to 21 to be described below. For example, referring to FIG. 18, one or more processors 102/202 may control one or more memories 104/106 and/or one or more transceivers 106/104 to perform the CSI measurement.

The UE may report CSI to the BS (S1450). That is, the BS may receive the CSI from the UE. For example, the CSI reporting operation may be performed based on the contents described in the CSI reporting of 4.1.5.2 described above. For example, the CSI report may be transmitted through an uplink channel (e.g., PUCCH/PUSCH). For example, the CSI may include PMI/CQI/RI. For example, as described in the above-described proposed method (e.g., Proposal A1/Proposal A2/Proposal A3 of Proposal 1, etc.), codebook-based CSI reporting may be performed. For example, the $i_{1,1}/i_{1,5}/i_{1,6,l}$ may not be reported in the case of a specific P/L value and/or a specific Mv value.

For example, the CSI may include $i_{1,7,l}$. For example, some (e.g., K) of all candidates that may be reported as $i_{1,7,l}$ may be reported, and the CSI may include K value/information for reporting K selected from all candidates. For example, the CSI may be reported by selecting N out of P CSI-RS ports received by the UE in relation to $i_{1,1}$, and information related to the selection of N CSI-RS ports may be included in the CSI.

For example, the CSI may vary depending on whether the DL/UL reciprocity is established. For example, when the BS/UE configures/reports that the DL/UL reciprocity is established, the UE may report the CSI based on the above-described proposed method (e.g., Proposal A1/A2/A3, etc.). For example, the CSI may further include the reciprocity related information between the DL/UL channels (e.g., whether there is DL/UL reciprocity, the degree of the similarity between the DL/UL channels, etc.).

For example, based on the CSI, the BS may transmit data scheduling information and/or data/RS (for data decoding) based on scheduling information to the UE. Precoding to be applied to data scheduling and data may be determined/calculated by the BS based on the CSI reported by the UE, but may not consider only the CSI reported by the UE.

For example, the operation of reporting the CSI to the BS by the UE (100/200 in FIGS. 17 to 21) in step S1450 described above may be implemented by the devices in FIGS. 17 to 21 to be described below. For example, referring to FIG. 18, one or more processors 102 may control one or more transceivers 106 and/or one or more memories 104 to report the CSI, and one or more transceivers 106 may transmit the CSI.

For example, the operation of receiving the CSI from the UE by the BS (100/200 in FIGS. 17 to 21) in step S1450 described above may be implemented by the devices in FIGS. 17 to 21 to be described below. For example, referring to FIG. 18, one or more processors 102 may control one or more transceivers 106 and/or one or more memories 104 to receive the CSI, and one or more transceivers 106 may receive the CSI.

As mentioned above, the above-described BS/UE signaling and operation (e.g., Proposal A1/Proposal A2/Proposal A3/FIG. 14, etc.) may be implemented by the devices (e.g., FIGS. 17 to 21) to be described below. For example, the BS may correspond to a first wireless device, the UE may correspond to a second wireless device, and vice versa.

Figure 18:
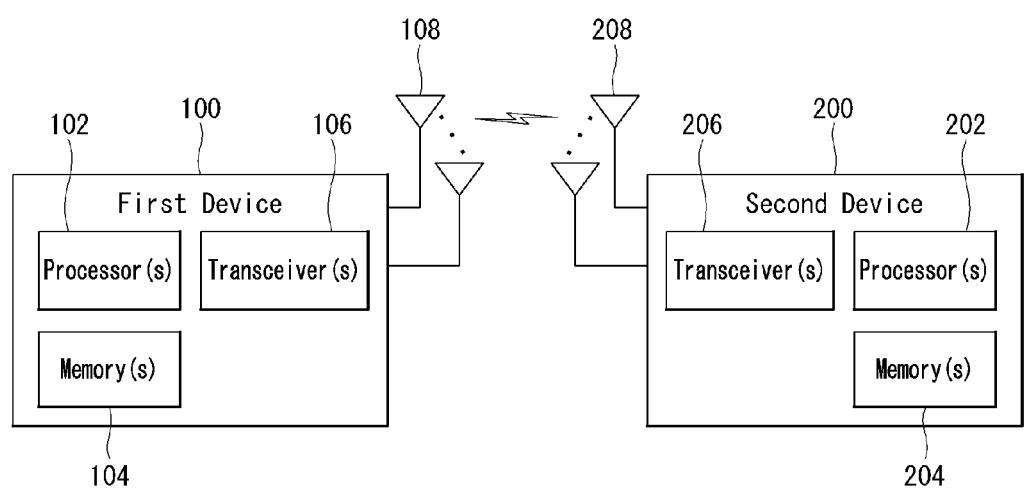
FIG. 18 illustrates wireless devices applicable to the present disclosure.

For example, the above-described BS/UE signaling and operations (e.g., proposal A1/proposal A2/proposal A3/FIG. 14, etc.) may be processed by one or more processors 102 and 202 in FIG. 18, and the above-described BS/UE signaling and operation (e.g., Proposal A1/Proposal A2/Proposal A3/FIG. 14, etc.) may be stored in the memory (e.g., one or more memories 104 and 204) in the form of the instruction/program (e.g., instruction, executable code) for driving at least one processor (e.g., 102 and 202) in FIG. 18.

The operations (e.g., operations related to reporting of channel state information based on at least one of Proposal 1, Proposal A1, Proposal A2, Proposal A3, Proposal 2, Proposal B1, and Proposal B2) of the BS/UE according to the above-described embodiments in terms of implementation may be processed by the devices in FIGS. 17 to 21 (e.g., the processors 102 and 202 in FIG. 18) to be described later.

In addition, the operations (e.g., operations related to reporting of channel state information based on at least one of Proposal 1, Proposal A1, Proposal A2, Proposal A3, Proposal 2, Proposal B1, and Proposal B2) of the BS/UE according to the above-described embodiment may be stored in the memory (e.g., 104 and 204 in FIG. 18) in the form of the instruction/program (e.g., instruction, executable code) for driving at least one processor (e.g., 102 and 202 in FIG. 18).

Hereinafter, the above-described embodiments will be described in detail with reference to FIGS. 15 and 16 in terms of the operation of the UE/BS. The methods described below are only distinguished for convenience of description, and it goes without saying that some components of one method may be substituted with some components of another method, or may be applied in combination with each other.

Figure 15:
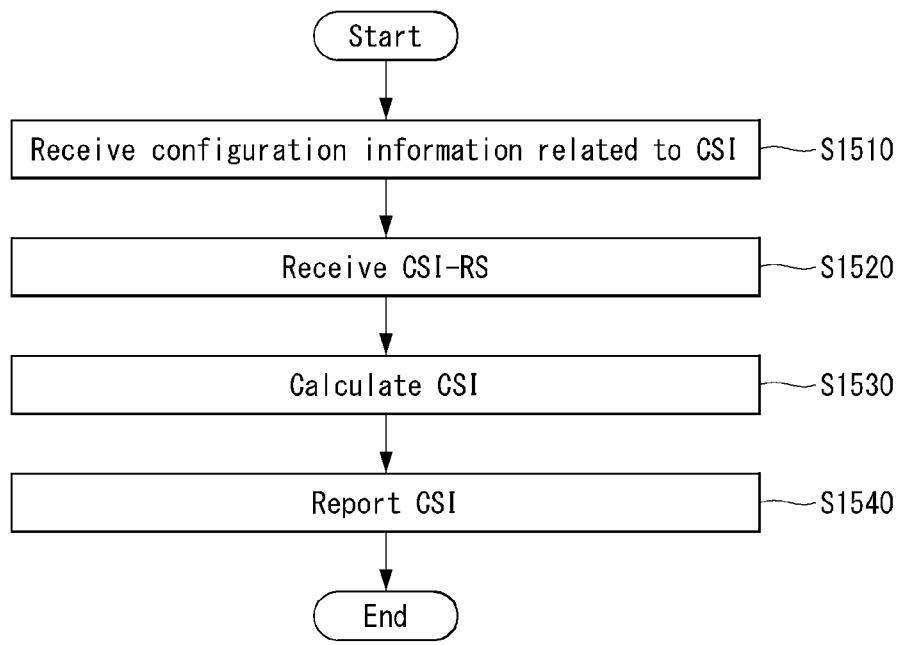
FIG. 15 is a flowchart for describing a method of reporting channel state information by a UE in a wireless communication system according to an embodiment of the present disclosure.

FIG. 15 is a flowchart for describing a method of reporting channel state information by a UE in a wireless communication system according to an embodiment of the present disclosure.

Referring to FIG. 15, a method of reporting channel state information (CSI) by a UE in a wireless communication system according to an embodiment of the present disclosure may include a CSI-related configuration information receiving step S1510, a CSI-RS receiving step S1520, a CSI calculating step S1530, and a CSI reporting step S1540.

In S1510, the UE receives, from the BS, configuration information related to reporting of channel state information (CSI). The configuration setting information may be based on the CSI-related configuration information (S710) or configuration (S1410).

According to S1510 described above, the operation of receiving the configuration information related to the reporting of the channel state information (CSI) from the BS (100/200 of FIGS. 17 to 21) by the UE (100/200 of FIGS. 17 to 21) may be implemented by the devices in FIGS. 17 to 21. For example, referring to FIG. 18, one or more processors 102 may control one or more transceivers 106 and/or one or more memories 104 to receive the configuration information related to the reporting of the channel state information (CSI) from the BS 200.

In S1520, the UE receives a channel state information-reference signal (CSI-RS) from the BS.

According to S1520 described above, the operation of receiving the channel state information-reference signal (CSI-RS) from the BS (100/200 of FIGS. 17 to 21) by the UE (100/200 of FIGS. 17 to 21) may be implemented by the devices in FIGS. 17 to 21. For example, referring to FIG. 18, one or more processors 102 may control one or more transceivers 106 and/or one or more memories 104 to receive the channel state information-reference signal (CSI-RS) from the BS 200.

In S1530, the UE calculates the CSI based on the CSI-RS. The calculation of the CSI-RS may be performed based on the description of S722 of FIG. 7 or S1440 of FIG. 14 described above.

According to an embodiment, based on a parameter (e.g., numberOfPMISubbandsPerCQISubband) related to the number of precoding matrix indicators (PMIs) based on a frequency band for reporting the CSI being configured to a value of 1 or less, the CSI may be calculated based on one or more specific subbands among subbands related to the frequency band for reporting the CSI. The embodiment may be based on Proposal 2.

According to S1530 described above, the operation of calculating the CSI based on the CSI-RS by the UE (100/200 in FIGS. 17 to 21) may be implemented by the devices in FIGS. 17 to 21. For example, referring to FIG. 18, one or more processors 102 may control one or more transceivers 106 and/or one or more memories 104 to calculate the CSI based on the CSI-RS.

In S1540, the UE reports the CSI, to the BS. The reporting of the CSI may be performed based on the description of S730 of FIG. 7 or S1450 of FIG. 14 described above.

According to an embodiment, the CSI may include first information for selecting an antenna port related to the CSI-RS. The embodiment may be based on Proposal A3. The first information may be based on $i_{1,1}$ described above in relation to (Enhanced) Type II codebook.

A preconfigured number of antenna ports may be selected for each polarization related to antenna port among antenna ports related to the CSI-RS, based on the first information.
wherein the preconfigured number of antenna ports are selected based on a combination of the number of the antenna ports related to the CSI-RS and the preconfigured number.

The number of antenna ports related to the CSI-RS may be half of a total number of antenna ports related to the CSI-RS. As an example, when the total number of antenna ports related to the CSI-RS is P, the number of antenna ports related to the CSI-RS may be P/2. The preconfigured number may be N/2.

According to an embodiment, a number of bits for reporting the first information may be determined based on a number of antenna port combinations that may be selected based on the preconfigured number among the antenna ports related to the CSI-RS. As an example, the number of bits for reporting the first information may be ceiling(log 2(combination(P, N))).

In the case of the conventional scheme, L CSI-RS port(s) contiguous for each polarization (based on port indices) are selected, and the freedom of port selection of the UE is reduced.

According to an embodiment, the preconfigured number of antenna ports may include antenna ports based on non-contiguous port indices. The embodiment may be based on Proposal A3. Specifically, N CSI-RS port(s) may be selected from all P CSI-RS ports. Alternatively, N/2 CSI-RS port(s) may be selected from P/2 CSI-RS ports for each polarization related to the CSI-RS port. Unlike the above-described conventional scheme, according to the embodiment, N (or N/2) CSI-RS port(s) may be selected based on the non-contiguous port indexes, so the freedom of port selection of the UE is improved.

According to an embodiment, the preconfigured number of antenna ports may be common to all layers related to the CSI-RS. That is, the antenna ports selected by the first information may have a layer common characteristic.

According to an embodiment, the CSI may include second information for selecting one or more frequency domain (FD) basis vectors. The first information may be based on $i_{1,5}$ and $i_{1,6,l}$ described above in relation to (Enhanced) Type II codebook.

Based on the second information, one or more frequency domain basis vectors may be selected among the frequency domain basis vectors based on a frequency band configured for reporting the CSI. As an example, the one or more frequency domain basis vectors may be based on the Mv vector(s) described above.

According to an embodiment, the CSI includes third information representing a non-zero coefficient. The third information may be based on $i_{1,7,l}$ described above in relation to Enhanced Type II codebook.

The non-zero coefficient represents a value (amplitude/phase coefficient indicators) reported in relation to one or more specific vectors.

The one or more specific vectors may be related to i) spatial domain (SD) vectors related to the preconfigured number of antenna ports and ii) the one or more frequency domain basis vectors.

Based on the first information and the second information being not reported, the third information may include information representing one or more specific antenna ports related to the non-zero coefficient among all antenna ports related to the CSI-RS. The embodiment may be based on Proposal 1.

Based on at least one of i) the total number (e.g., P) of antenna ports related to the CSI-RS, ii) the preconfigured number (e.g., L or N/2), or iii) the number (e.g., Mv) of one or more frequency domain basis vectors being preconfigured to a specific value, the first information and the second information may not be reported.

According to S1540 described above, the operation of reporting the CSI to the BS (100/200 of FIGS. 17 to 21) by the UE (100/200 of FIGS. 17 to 21) may be implemented by the devices in FIGS. 17 to 21. For example, referring to FIG. 18, one or more processors 102 may control one or more transceivers 106 and/or one or more memories 104 to report the CSI signal to the BS 200.

Figure 16:
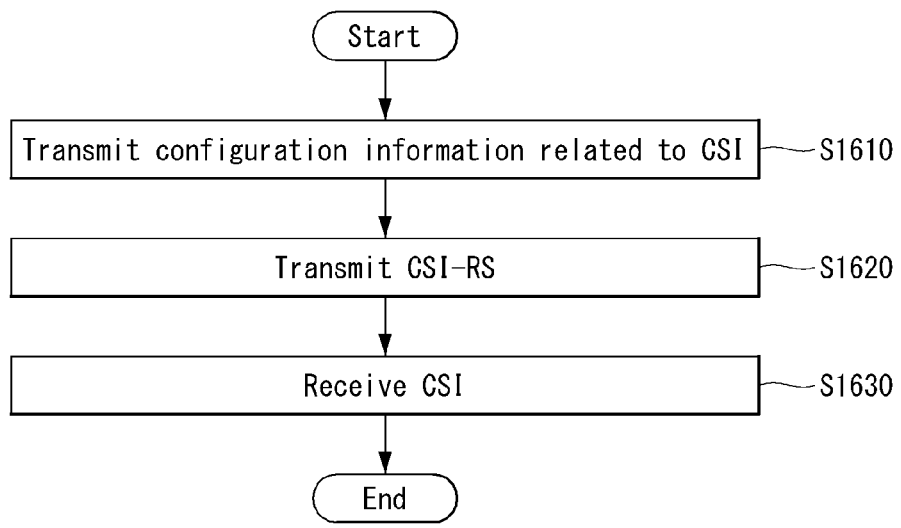
FIG. 16 is a flowchart for describing a method of receiving channel state information by a BS in a wireless communication system according to another embodiment of the present disclosure.

FIG. 16 is a flowchart for describing a method of receiving channel state information by a BS in a wireless communication system according to another embodiment of the present disclosure.

Referring to FIG. 16, a method of reporting channel state information (CSI) by a BS in a wireless communication system according to another embodiment of the present disclosure may include a CSI-related configuration information transmitting step S1610, a CSI-RS transmitting step, S1620, and a CSI receiving step S1630.

S1610, the BS transmits, to the UE, configuration information related to reporting of channel state information (CSI). The configuration setting information may be based on the CSI-related configuration information (S710) or configuration (S1410).

According to S1610 described above, the operation of transmitting the configuration information related to reporting of channel state information (CSI) to the UE (100/200 in FIGS. 17 to 21) by the BS (100/200 in FIGS. 17 to 21) may be implemented by the devices in FIGS. 17 to 21. For example, referring to FIG. 18, one or more processors 202 may control one or more transceivers 206 and/or one or more memories 204 to transmit the configuration information related to reporting of channel state information (CSI) to the UE 100.

In S1620, the BS transmits a channel state information-reference signal (CSI-RS) to the UE.

According to S1620 described above, the operation of transmitting the channel state information-reference signal (CSI-RS) to the UE (100/200 in FIGS. 17 to 21) by the BS (100/200 in FIGS. 17 to 21) may be implemented by the devices in FIGS. 17 to 21. For example, referring to FIG. 18, one or more processors 202 may control one or more transceivers 206 and/or one or more memories 204 to transmit the channel state information-reference signal (CSI-RS) to the UE 100.

In S1630, the BS receives the CSI from the UE.

Specifically, the UE calculates the CSI based on the CSI-RS. The calculation of the RS may be performed based on the description of S722 of FIG. 7 or S1440 of FIG. 14 described above. The CSI is reported to the BS by the UE. The reporting of the CSI may be performed based on the description of S730 of FIG. 7 or S1450 of FIG. 14 described above.

According to an embodiment, based on a parameter (e.g., numberOfPMISubbandsPerCQISubband) related to the number of precoding matrix indicators (PMIs) based on a frequency band for reporting the CSI being configured to a value of 1 or less, the CSI may be calculated based on one or more specific subbands among subbands related to the frequency band for reporting the CSI. The embodiment may be based on Proposal 2.

According to an embodiment, the CSI may include first information for selecting an antenna port related to the CSI-RS. The embodiment may be based on Proposal A3. The first information may be based on $i_{1,1}$ described above in relation to (Enhanced) Type II codebook.

A preconfigured number of antenna ports may be selected for each polarization related to antenna port among antenna ports related to the CSI-RS, based on the first information.

The preconfigured number of antenna ports may be selected based on a combination of the number of the antenna ports related to the CSI-RS and the preconfigured number.

The number of antenna ports related to the CSI-RS may be half of a total number of antenna ports related to the CSI-RS. As an example, when the total number of antenna ports related to the CSI-RS is P, the number of antenna ports related to the CSI-RS may be P/2. The preconfigured number may be N/2.

According to an embodiment, a number of bits for reporting the first information may be determined based on a number of antenna port combinations that may be selected based on the preconfigured number among the antenna ports related to the CSI-RS. As an example, the number of bits for reporting the first information may be ceiling(log 2(combination(P, N))).

In the case of the conventional scheme, L CSI-RS port(s) contiguous for each polarization (based on port indices) are selected, and the degree of freedom in port selection of the BS is reduced.

According to an embodiment, the preconfigured number of antenna ports may include antenna ports based on non-contiguous port indices. The embodiment may be based on Proposal A3. Specifically, N CSI-RS port(s) may be selected from all P CSI-RS ports. Alternatively, N/2 CSI-RS port(s) may be selected from P/2 CSI-RS ports for each polarization related to the CSI-RS port. Unlike the above-described conventional scheme, according to the embodiment, N (or N/2) CSI-RS port(s) may be selected based on the non-contiguous port indexes, so the freedom of port selection of the BS may be improved.

According to an embodiment, the preconfigured number of antenna ports may be common to all layers related to the CSI-RS. That is, the antenna ports selected by the first information may have a layer common characteristic.

According to an embodiment, the CSI may include second information for selecting one or more frequency domain (FD) basis vectors. The first information may be based on $i_{1,5}$ and $i_{1,6,l}$ described above in relation to (Enhanced) Type II codebook.

Based on the second information, one or more frequency domain basis vectors may be selected among the frequency domain basis vectors based on a frequency band configured for reporting the CSI. As an example, the one or more frequency domain basis vectors may be based on the Mv vector(s) described above.

According to an embodiment, the CSI includes third information representing a non-zero coefficient. The third information may be based on $i_{1,7,l}$ described above in relation to Enhanced Type II codebook.

The non-zero coefficient represents a value (amplitude/phase coefficient indicators) reported in relation to one or more specific vectors.

The one or more specific vectors may be related to i) spatial domain (SD) vectors related to the preconfigured number of antenna ports and ii) the one or more frequency domain basis vectors.

Based on the first information and the second information being not reported, the third information may include information representing one or more specific antenna ports related to the non-zero coefficient among all antenna ports related to the CSI-RS. The embodiment may be based on Proposal 1.

Based on at least one of i) the total number (e.g., P) of antenna ports related to the CSI-RS, ii) the preconfigured number (e.g., L or N/2), or iii) the number (e.g., Mv) of one or more frequency domain basis vectors being preconfigured to a specific value, the first information and the second information may not be reported.

According to S1630 described above, the operation of receiving the CSI from the UE base station (100/200 in FIGS. 17 to 21) by the BS (100/200 in FIGS. 17 to 21) may be implemented by the devices in FIGS. 17 to 21. For example, referring to FIG. 18, one or more processors 202 may control one or more transceivers 206 and/or one or more memories 204 to receive the CSI from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
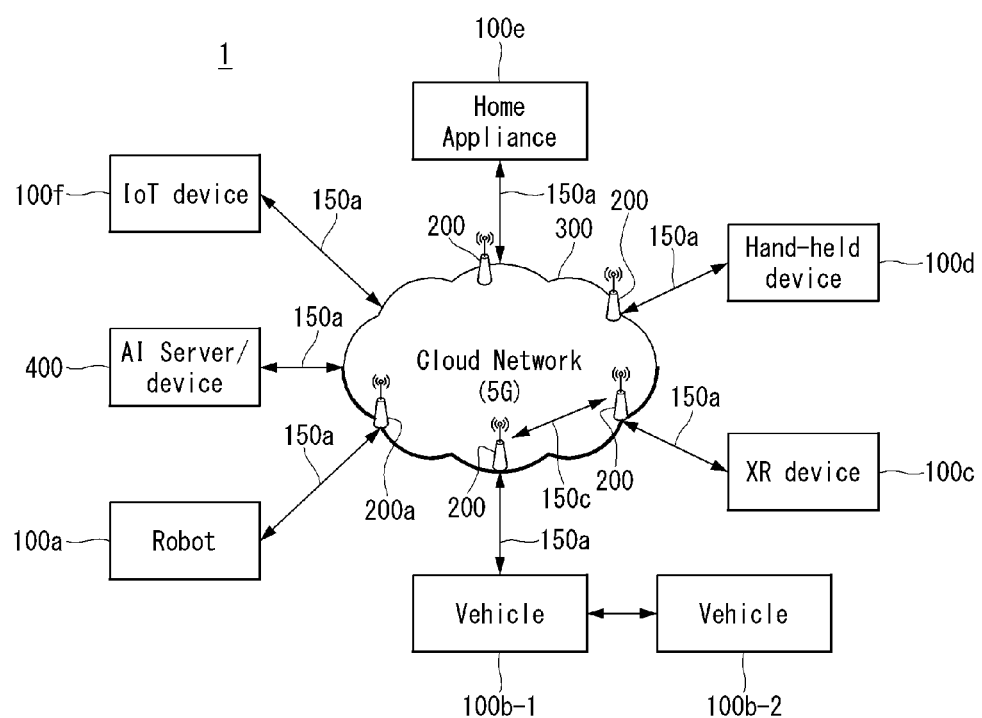
FIG. 17 illustrates a communication system 1 applied to the present disclosure.

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the A1 server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17:

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

Figure 19:
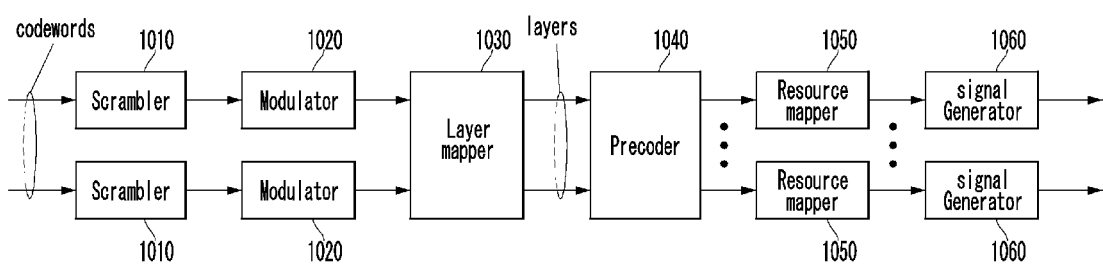
FIG. 19 illustrates a signal process circuit for a transmission signal.

FIG. 19 illustrates a signal process circuit for a transmission signal.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18: Hardware elements of FIG. 19 may be implemented by the processors 102 and 202 and/or the transceivers 106 and 206 of FIG. 18: For example, blocks 1010 to 1060 may be implemented by the processors 102 and 202 of FIG. 18: Alternatively, the blocks 1010 to 1050 may be implemented by the processors 102 and 202 of FIG. 18 and the block 1060 may be implemented by the transceivers 106 and 206 of FIG. 18:

Codewords may be converted into radio signals via the signal processing circuit 1000 of FIG. 19: Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19: For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

Figure 20:
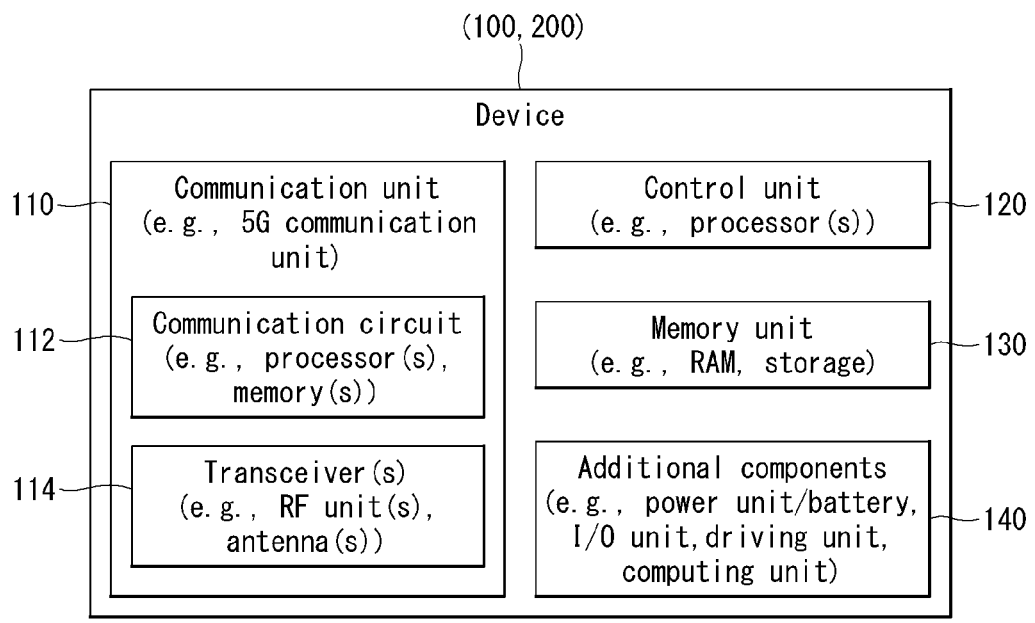
FIG. 20 illustrates another example of a wireless device applied to the present disclosure.

FIG. 20 illustrates another example of a wireless device applied to the present disclosure.

The wireless device may be implemented in various forms according to a use-case/service (refer to FIG. 17: Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18: For example, the transceiver(s) 114 may include the one or more transceivers 106 and 206 and/or the one or more antennas 108 and 208 of FIG. 18: The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

Figure 21:
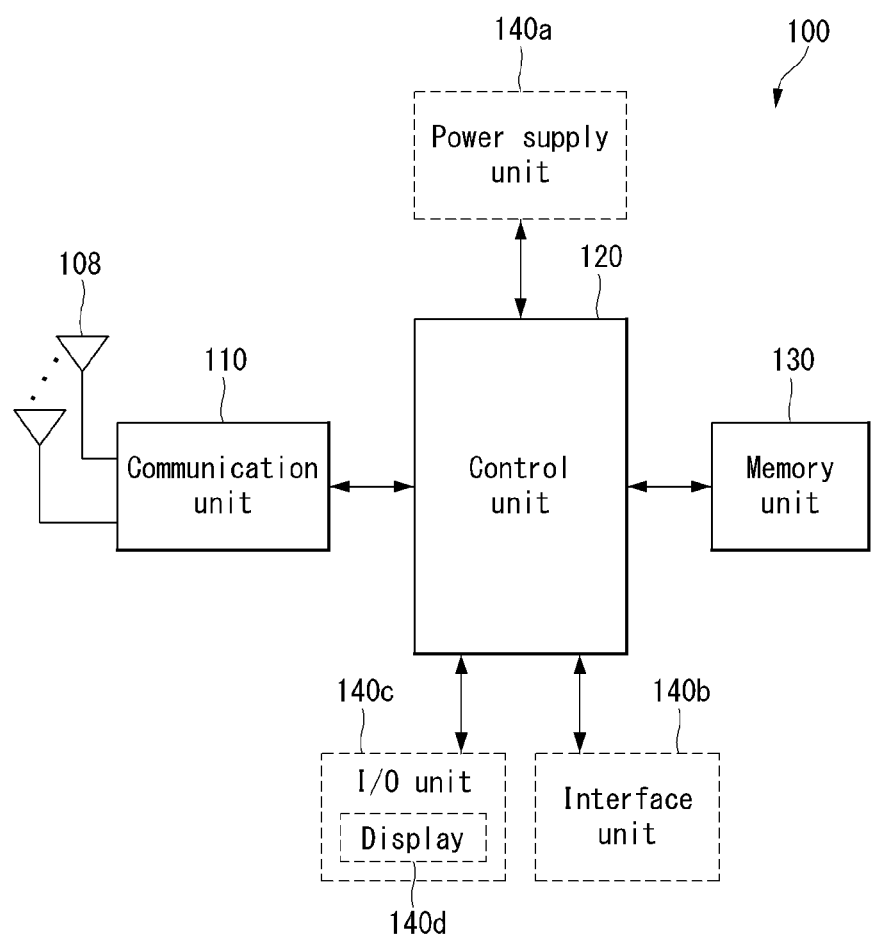
FIG. 21 illustrates a hand-held device applied to the present disclosure.

FIG. 21 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method performed by a user equipment (UE) in a wireless communication system, the method comprising:
receiving configuration information related to reporting of channel state information (CSI);
receiving a channel state information-reference signal (CSI-RS);
computing the CSI based on the CSI-RS; and
reporting the CSI,
wherein the CSI includes first information for selecting a plurality of antenna ports related to the CSI-RS, wherein K antenna ports are selected from P antenna ports related to the CSI-RS, based on the first information, and wherein, for each polarization related to the plurality of antenna ports, K/2 antenna ports are selected from P/2 antenna ports related to the CSI-RS based on a combination of P/2 and K/2, and wherein a bitwidth for the first information is $$\left\lceil \log_2 \binom{P/2}{K/2} \right\rceil.$$

$\lceil\ \rceil$ is a ceiling function and $$\binom{x}{y}$$

is a combinatorial coefficient C(x, y).

2. The method of claim 1, wherein P is a total number of antenna ports related to the CSI-RS.

3. The method of claim 1, wherein the K antenna ports includes antenna ports based on non-contiguous port indices.

4. The method of claim 1, wherein the K (antenna ports are common to all layers related to the CSI-RS.

5. The method of claim 1, wherein the CSI includes second information for selecting one or more frequency domain (FD) basis vectors, and wherein based on the second information, one or more frequency domain basis vectors are selected among frequency domain basis vectors based on a frequency band configured for reporting the CSI.

6. The method of claim 5, wherein the CSI includes third information representing a non-zero coefficient, wherein the non-zero coefficient represents a value reported in relation to one or more specific vectors, and wherein the one or more specific vectors are related to i) spatial domain (SD) vectors related to the K antenna ports and ii) the one or more frequency domain basis vectors.

7. The method of claim 6, wherein based on the first information and the second information being not reported, the third information includes information representing one or more specific antenna ports related to the non-zero coefficient among all antenna ports related to the CSI-RS.

8. The method of claim 7, wherein based on at least one of i) P which is a total number of antenna ports related to the CSI-RS, ii) K which is a number of antenna ports selected from the P antenna ports, or iii) a number of the one or more frequency domain basis vectors being preconfigured to a specific value, the first information and the second information are not reported.

9. The method of claim 1, wherein based on a parameter related to the number of precoding matrix indicators (PMIs) based on a frequency band for reporting the CSI being configured to a value of 1 or less, the CSI is calculated based on one or more specific subbands among subbands related to the frequency band for reporting the CSI.

10. A user equipment (UE) operating in a wireless communication system, the UE comprising:
one or more transceivers;
one or more processors; and
one or more memories operatively connectable to the one or more processors,
wherein when the one or more memories are executed by the one or more processors, the one or more memories store instructions which cause the one or more processors to perform operations,
wherein the operations include
receiving configuration information related to reporting of channel state information (CSI);
receiving a channel state information-reference signal (CSI-RS);
computing the CSI based on the CSI-RS; and
reporting the CSI, and
wherein the CSI includes first information for selecting a plurality of antenna ports related to the CSI-RS,
wherein K antenna ports are selected from P antenna ports related to the CSI-RS, based on the first information, and
wherein, for each polarization related to the plurality of antenna ports, K/2 antenna ports are selected from P/2 antenna ports related to the CSI-RS based on a combination of P/2 and K/2, and
wherein a bitwidth for the first information is $$\left\lceil \log_2 \binom{P/2}{K/2} \right\rceil.$$

$\lceil\ \rceil$ is a ceiling function and $$\binom{x}{y}$$

is a combinatorial coefficient C(x, y).

11. A base station (BS) operating in a wireless communication system, the BS comprising:
one or more transceivers;
one or more processors; and
one or more memories operatively connectable to the one or more processors,
wherein when the one or more memories are executed by the one or more processors, the one or more memories store instructions which cause the one or more processors to perform operations,
wherein the operations include
transmitting configuration information related to reporting of channel state information (CSI);
transmitting a channel state information-reference signal (CSI-RS); and
receiving the CSI,
wherein the CSI includes first information for selecting a plurality of antenna ports related to the CSI-RS,
wherein K antenna ports are selected from P antenna ports related to the CSI-RS, based on the first information,
wherein, for each polarization related to the plurality of antenna ports, K/2 antenna ports are selected from P/2 antenna ports related to the CSI-RS based on a combination of P/2 and K/2, and
wherein a bitwidth for the first information is $$\left\lceil \log_2 \binom{P/2}{K/2} \right\rceil,$$

⌈ ⌉ is a ceiling function and $$\binom{x}{y}$$

is a combinatorial coefficient C(x, y).

\* \* \* \* \*